US011859716B2

(12) United States Patent
Zhu et al.

(10) Patent No.: US 11,859,716 B2
(45) Date of Patent: *Jan. 2, 2024

(54) TIME-DELAY CLOSED-LOOP CONTROL OF AN INFINITELY VARIABLE TRANSMISSION SYSTEM FOR TIDAL CURRENT ENERGY CONVERTERS

(71) Applicant: UNIVERSITY OF MARYLAND, BALTIMORE COUNTY, Baltimore, MD (US)

(72) Inventors: Weidong Zhu, Ellicott City, MD (US); Gang Li, Halethorpe, MD (US); Meilin Yu, Baltimore, MD (US); Xuefeng Wang, Scott Depot, WV (US)

(73) Assignee: University of Maryland, Baltimore County, Baltimore, MD (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/723,805

(22) Filed: Apr. 19, 2022

(65) Prior Publication Data

US 2022/0252151 A1    Aug. 11, 2022

Related U.S. Application Data

(60) Continuation-in-part of application No. 17/684,507, filed on Mar. 2, 2022, now Pat. No. 11,686,388,
(Continued)

(51) Int. Cl.
*F16H 59/70*    (2006.01)
*F16H 61/664*    (2006.01)
(Continued)

(52) U.S. Cl.
CPC ............ *F16H 61/664* (2013.01); *F16H 3/76* (2013.01); *F16H 59/40* (2013.01); *F16H 59/42* (2013.01);
(Continued)

(58) Field of Classification Search
CPC .......... F16H 61/664; F16H 3/76; F16H 59/40; F16H 59/42; F16H 59/70; F16H 59/44;
(Continued)

(56) References Cited

U.S. PATENT DOCUMENTS 1,697,574 A    1/1929    Savonius
1,892,504 A    10/1929    Davis
(Continued)

FOREIGN PATENT DOCUMENTS

CN    108252846 A    *    7/2018
CN    109555650 A    *    4/2019    ............. A01K 61/60
(Continued)

OTHER PUBLICATIONS

20% Wind Energy by 2030; Increasing Wind Energy's Contribution to U.S. Electricity Supply; DOE/GO-102008-2567; Jul. 2008; http://www.osti.gov/bridge; U.S. Depratment of Energy.
(Continued)

*Primary Examiner* — Justin Holmes
(74) *Attorney, Agent, or Firm* — Casimir Jones, SC; Tristan A. Fuierer

(57) ABSTRACT

A tidal current energy converter including an infinitely variable transmission (IVT) control system and a hybrid vertical axis wind (or water) turbine (VAWTs) apparatus. The hybrid VAWT apparatus includes a modified-Savonius (MS) rotor in the central region and a straight bladed H-type Darrieus rotor in the surrounding annular region. The IVT control system includes a nonlinear closed-loop control combined with an integral time-delay feedback control to adjust a speed ratio of the IVT. A speed ratio control for an IVT system involves a forward speed controller and/or a crank length controller for different speed ranges. The time-delay control is designed to reduce speed fluctuations of the output speed of an IVT with an accurate speed ratio.
(Continued)

The speed ratio of an IVT with the disclosed control strategy can achieve an excellent tracking response for the desired constant output speed and reduce speed fluctuations of the output speed of an IVT by the time-delay feedback control.

24 Claims, 17 Drawing Sheets

Related U.S. Application Data which is a division of application No. 17/232,225, filed on Apr. 16, 2021, now Pat. No. 11,268,615, application No. 17/723,805 is a continuation-in-part of application No. 16/851,602, filed on Apr. 17, 2020, now Pat. No. 11,313,348.

(60) Provisional application No. 63/010,928, filed on Apr. 16, 2020, provisional application No. 62/835,061, filed on Apr. 17, 2019.

(51) Int. Cl.
  *F16H 59/40* (2006.01)
  *F16H 59/42* (2006.01)
  *F16H 3/76* (2006.01)
  *F16H 59/44* (2006.01)
  *F16H 61/00* (2006.01)

(52) U.S. Cl.
  CPC ............ *F16H 59/70* (2013.01); *F16H 59/44* (2013.01); *F16H 2059/704* (2013.01); *F16H 2061/009* (2013.01); *F16H 2061/0096* (2013.01)

(58) Field of Classification Search
  CPC ......... F16H 2059/704; F16H 2061/009; F16H 2061/0096; F16H 3/72; F16H 21/20; F16H 61/66; F05B 2250/315; F05B 2260/4031; F05B 2270/101; F03B 17/062; F03B 13/26; Y02E 10/30; Y02E 10/74
  See application file for complete search history.

(56) References Cited

U.S. PATENT DOCUMENTS

| | | | |
|---|---|---|---|
| 1,766,765 A | 6/1930 | Savonius | |
| 1,835,018 A | 12/1931 | Darrieus | |
| 3,918,839 A | 11/1975 | Blackwell et al. | |
| 3,922,012 A * | 11/1975 | Herz | F03B 17/065 416/111 |
| 5,392,664 A | 2/1995 | Gogins | |
| 7,362,004 B2 | 4/2008 | Becker | |
| 8,790,069 B2 | 7/2014 | Anderson | |
| 9,222,558 B2 * | 12/2015 | Zhu | F16H 29/20 |
| 10,774,807 B2 | 9/2020 | Pul | |
| 11,268,615 B2 * | 3/2022 | Zhu | F16H 59/42 |
| 11,313,348 B2 * | 4/2022 | Yu | F03D 3/065 |
| 2006/0275105 A1 | 12/2006 | Roberts et al. | |
| 2009/0003999 A1 | 1/2009 | Whitworth et al. | |
| 2009/0045632 A1 | 2/2009 | Krauss | |
| 2009/0220342 A1 | 9/2009 | Wu et al. | |
| 2011/0142641 A1 | 6/2011 | Anderson | |
| 2011/0148116 A1 | 6/2011 | Halstead | |
| 2012/0007366 A1 | 1/2012 | Belden | |
| 2012/0148403 A1 | 6/2012 | Flaherty et al. | |
| 2013/0026761 A1 | 1/2013 | Rajadhyaksha et al. | |
| 2013/0195636 A1 | 8/2013 | Poole | |
| 2013/0287570 A1 | 10/2013 | Gdovic | |
| 2013/0315703 A1 | 11/2013 | Dacus et al. | |
| 2014/0161642 A1 | 6/2014 | Rajadhyaksha et al. | |
| 2014/0265335 A1 | 9/2014 | Andreis et al. | |
| 2014/0361545 A1 | 12/2014 | Ghosh | |
| 2016/0377053 A1 | 12/2016 | Reyna et al. | |
| 2018/0135599 A1 | 5/2018 | Baxter, Jr. | |
| 2019/0093629 A1 | 3/2019 | Juarez | |
| 2019/0242361 A1 | 8/2019 | Song | |
| 2020/0072190 A1 | 3/2020 | Buchanan | |
| 2020/0149510 A1 | 5/2020 | Hug et al. | |
| 2020/0300217 A1 | 9/2020 | Reyna et al. | |

FOREIGN PATENT DOCUMENTS

| | | | |
|---|---|---|---|
| CN | 109764099 | | 5/2019 |
| JP | 2015001266 | | 1/2015 |
| KR | 20180074057 | | 7/2018 |
| KR | 20180074057 A | * | 7/2018 |

OTHER PUBLICATIONS

2010 Census: Maryland Profile, Population Density by Census Tract, U.S. Census Bureau.

Al-Mulali, Usama, et al.; "Exploring the relationship between urbanization, energy comsumption, and CO2 emission in MENA countries," Renewable and Sustainable Energy Reviews, 2013, vol. 23, pp. 107-112.

Altan, Burçin Deda, et al.; "An experimental and numerical study on the improvement of the performance of Savonius wind rotor," Energy Conversion and Management, 2008, vol. 49, pp. 3425-3432.

Araya et al., "A comparison of wake measurements in motor-driven and flow-driven turbine experiments," Exp. Fluid, vol. 56 (7) (2015), p. 150.

Baker, J.R.; Features to aid or enable self starting of fixed pitch low solidity vertical axis wind turbines, Journal of Wind Engineering and Industrial Aerodynamics, 1983, vol. 15, pp. 369-380.

Bazilevs, Y., et al.; "Fluid-structure interaction modeling of vertical-axis wind turbines," J. Appl. Mech., 2014, vol. 81, 081006-081006-8.

Beri et al. "Double multiple stream tube model and numerical analysis of vertical Axis wind turbine," Energy Power Eng., vol. 3 (3) (2011), pp. 262-270.

Betz, Introduction to the Theory of Flow Machines, Pergamon Press, Oxford, UK (1966); A Book, Reference Not Attached; Abstract Only.

Bhuyan et al., "Investigations on self-starting and performance characteristics of simple H and hybrid H-Savonius vertical axis wind rotors—science direct," Energy Convers. Manag., vol. 87 (2014), pp. 859-867.

Buchner, A-J., et al.; "Dynamic stall in vertical axis wind turbines:Comparing experiments and computations," J. Wind. Eng. Ind. Aerodyn., 2015, vol. 146, pp. 163-171.

Castelli et al., "Modeling strategy and numerical validation for a Darrieus vertical Axis micro-wind turbine," ASME 2010 International Mechanical Engineering Congress & Exposition, Vancouver, British Columbia, Canada (2010).

Castelli, M.R., et al.; "Effect of blade inclination angle on a Darrieus wind turbine," J. Turbomachinery, vol. 134 (3) (2011), 031016-031016-10; Abstract Only.

Chowdhury, K. S. Rahman, V. Selvanathan, N. Nuthammachot, M. Suklueng, A. Mostafaeipour, A. Habib, M. Akhtaruzzaman, N. Amin, K. Techato, Current trends and prospects of tidal energy technology, Environment, Development and Sustainability (2021) 23: 8179-8194.

Dabiri, J.O., et al.; A new approach to wind energy: opportunities and challenges, AIP Conf. Proc., 2015, vol. 1652, pp. 51-57.

Dabiri, J.O., et al.; "Emergent aerodynamics in wind farms," Phys. Today, 2014, vol. 67, pp. 66-67.

Dabiri, J.O.; Potential order-of-magnitude enhancement of wind farm power density via counter-rotating vertical-axis wind turbine arrays, J. Renew. Sustain. Energy, 2011, vol. 3, pp. 043-104.

Damak, A., et al.; "Experimental Investigation of helical Savonius rotor with a twist of 180°," Renewable Energy, 2013, vol. 52, pp. 136-142.

(56) References Cited

OTHER PUBLICATIONS

Danao, Louis Angelo, et al.; "A numerical investigation into the influence of unsteady wind on the performance and aerodynamics of a vertical axis wind turbine," Applied Energy, 2014, vol. 116, pp. 111-124.
Danao, Louis Angelo, et al.; "An experimental investigation into the influence of unsteady wind on the performance of a vertical axis wind turbine," Applied Energy, 2013, vol. 107, pp. 403-411.
Debnath, B.K. et al.; "Computational fluid dynamics analysis of a combined three-bucket Savonius and three-bladed Darrieus rot," J. Renew. Sustain. Energy, 1 (3) (2009), Article 033110.
Denny, "The economics of tidal energy," Energy Policy, vol. 37, pp. 1914-1924, 2009; Abstract Only.
Dominy, R., et al.; "Self-starting capability of a Darrieus turbine," Proc. IME J. Power Energy, 2007, vol. 221, DOI: 10.1243/09576509JPE340.
Dsire, Maryland, Renewable Energy Portfolio Standard, NC Clean Energy Technology Center, 2018.
Earwaker, C. E. Zervas, Assessment of the National Ocean Service's Tidal Current Program, National Oceanic and Atmospheric Administration, 1999. Can Not Locate Reference.
Economic Research Service, Maryland, Three rural definitions based on Census Places, U.S. Department of Agriculture, 2018. Can Not Locate Reference.
Electricity installed generating capacity by country, MECOMeter.
Elzaghir, W., Zhang, Y., Natarajan, N., Massey, F., and Mi, C. C., 2018, "Model Reference Adaptive Control for Hybrid Electric Vehicle With Dual Clutch Transmission Configurations," IEEE Transactions on Vehicular Technology, 67(2), pp. 991-999.
Eriksson, Sandra, et al.; "Evaluation of different turbine concepts for wind power," Renewable and Sustainable Energy Reviews, 2008, vol. 12, pp. 1419-1434.
Everett, G. Boyle, S. Peake, J. Ramage, Energy Systems and Sustain-ability: Power for a Sustainable Future, Oxford University Press, 2012; Book.
Ferreira et al., "2D PIV visualization of dynamic stall on a vertical Axis wind turbine," 45th AIAA Aerospace Sciences Meeting and Exhibit, Reno, Nevada (2007); Abstract Only.
Fraenkel, Power from marine currents, Proceedings of the Institution of Mechanical Engineers, Part A: Journal of Power and Energy 216 (2002) A01801.
Frid, E. Andonegi, J. Depestele, A. Judd, D. Rihan, S. I. Rogers, E. Kenchington, The environmental interactions of tidal and wave energy generation devices, Environmental Impact Assessment Review 32 (1) (2012) 133-139.
Funke, S. C. Kramer, M. D. Piggott, Design optimisation and resource assessment for tidal stream renewable energy farms using a new continuous turbine approach, Renewable Energy 99 (2016) 1046-1061.
Gavalda et al.; "Experimental study on a self-adapting Darrieus-Savonius wind machine," Sol. Wind Technol., vol. 7 (4) (1990), pp. 457-461.
Giallanza, M. Porretto, L. Cannizzaro, G. Marannano, Analysis of the maximization of wind turbine energy yield using a continuously variable transmission system, Renewable Energy 102 (2017) 481-486.
Glitzenstein, K., and Hedrick, J. K., 1990, "Adaptive Control of Automotive Transmissions," Proceedings of the 1990 American Control Conference, San Diego, pp. 1849-1855; Abstract Only.
Global Vertical Axis Wind Turbine Market Research Report 2020, Industry Research, 2020; Abstract Only.
Groth et al.; "Rural wind farm development: Social, environmental and economic features important to local residents," Renewable Energy, vol. 63, pp. 1-8, 2014. Abstract Only.
Gupta, A. et al.; Computational fluid dynamics analysis of a twisted three bladed H-Darrieus rotor, J. Renew. Sustain. Energy, 2010, vol. 1; Article 043111.
Haas, H. M. Fritz, S. P. French, B. T. Smith, V. Neary, Assessment of energy production potential from tidal streams in the united states, Tech. rep., Georgia Tech Research Corporation (2011).
Hill, N., et al.; "Darrieus turbines: the physics of self-starting," Proc IME J. Power Energy, 2009, vol. 223, pp. 21-29; DOI: 10.1243/09576509JPE615.
Hitaj et al.; "Trends in U.S. Agriculture's Consumption and Production of Energy: Renewable Power, Shale Energy, and Cellulosic Biomass," United States Department of Agriculture, 2016.
Houlsby et al., "The power available to tidal turbines in an open channel flow," Proceedings of the Institution of Civil Engineers—Energy, vol. 170, pp. 12-21, 2017; Abstract Only.
Irabu, Kunio, et al.; "Characteristics of wind power on Savonius rotor using a guide-box tunnel," Experimental Thermal and Fluid Science, 2007, vol. 32, pp. 580-586.
Isermann, R., and Münchhof, M., 2011, Identification of Dynamic Systems: An Introduction with Applications, vol. 1, Springer, Berlin Heidelberg.
Ishugah, T.F., et al.; "Advances in Wind Energy Resource Exploitation in urban environment: A review," Renewable and Sustainable Energy Reviews, 2014, vol. 37, pp. 613-626.
Islam, Mazharul, et al.; "Aerodynamic models for Darrieus-type straight-bladed vertical axis wind turbines," Renewable and Sustainable Energy Reviews, 2008, vol. 12, pp. 1087-1109.
Kamoji, M.A. et al.; "Performance tests on helical savonius rotors," Renewable Energy, 2009, vol. 34, pp. 521-529.
Kang, Can, et al.; "Review of fluid dynamics aspects of Savonius-rotor-based vertical axis wind rotors," Renewable and Sustainable Energy Reviews, 2014, vol. 33, pp. 499-508.
Kempener, F. Neumann, Tidal energy technology brief, International Renewable Energy Agency (IRENA) (2014) 1-34.
Kerr et al.; "Understanding community benefit payments from renewable energy development," Energy Policy, vol. 105, pp. 202-211, 2017.
Khare, C. Khare, S. Nema, P. Baredar, Tidal Energy Systems: Design, Optimization and Control, Elsevier, 2018. Book.
Kinzel, M., et al.; "Energy exchange in an array of vertical-axis wind turbines," J. Turbul., 2012, vol. 13, p. N38; Abstract Only.
Kirke, B., et al.; Enhancing the performance of vertical axis wind turbine using a simple variable pitch system, Wind Eng., 1991, vol. 15, pp. 187-195.
Kou et al.; "Modeling analysis and experimental research on a combined-type vertical axis wind turbine," 2011 International Conference on Electronics, Communications and Control (ICECC), Ningbo, China (2011)—Abstract Only.
Kulkarni, M., Shim, T., and Zhang, Y., 2007, "Shift Dynamics and Control of Dual-Clutch Transmissions," Mechanism and Machine Theory, 42(2), pp. 168-182.
Kyozuka, "An experimental study on the darrieus-savonius turbine for the tidal current power generation," J. Fluid Sci. Technol., vol. 3 (2008), pp. 439-449.
Laws et al.; "Hydrokinetic energy conversion: Technology, research, and outlook," Renewable and Sustainable Energy Reviews, vol. 57, pp. 1245-1259, 2016.
Lewis, S. Neill, P. Robins, M. Hashemi, Resource assessment for future generations of tidal stream energy arrays, Energy 83 (2015) 403-415.
Li et al., Time-delay closed-loop control of an infinitely variable transmission system for tidal current energy converters. Renewable Energy. 2022;189:1120-1132.
Li, Chao, et al.; "2.5D large eddy simulation of vertical axis wind turbine in consideration of high angle of attack flow," Renewable Energy, 2013; vol. 51, pp. 317-330.
Li, W. Zhu, Design and power loss evaluation of a noncircular gear pair for an infinitely variable transmission, Mechanism and Machine Theory, 156, 2021, 104137.
Liu, F., Li, Y. X., Zhang, J. W., Huang, H. C., and Zhao, H. P., 2002, "Robust Control for Automated Clutch of AMT Vehicle," SAE Technical Paper, 2002-01-0933; Abstract Only.
Liu, Kan, et al.; "Enhancing wind energy harvesting performance of vertical axis wind turbines with a new gybrid design: A fluid-structure interaction study," Renewable Energy, 2019, vol. 140, pp. 912-927.
Liu, W. Li, Y.G. Lin, S. Ma, Tidal current turbine based on hydraulic transmission system, Journal of Zhejiang University—Science A 12 (7) (2011) 511-518.

(56) References Cited

OTHER PUBLICATIONS

Liu, Y. Lin, M. Shi, W. Li, H. Gu, Q. Xu, L. Tu, A novel hydraulic-mechanical hybrid transmission in tidal current turbines, Renewable Energy 81 (2015) 31-42.
MacPhee, David, et al.; "Recent advances in rotor design of vertical axis wind turbines," Wind Engineering, 2012, vol. 36, pp. 647-666.
Mahato, S. K. Ghoshal, Various power transmission strategies in wind turbine: An overview, International Journal of Dynamics and Control 7 (3) (2019) 1149-1156; Abstract Only.
Mahmood, M., et al.; "Vertical axis wind turbine—A review of various configurations and design techniques," Renewable and Sustainable Energy Reviews, 2012, vol. 16, pp. 1926-1939.
Manwell, J. F., McGowan, J. G., and Rogers, A. L., 2010, Wind Energy Explained: Theory, Design and Application, John Wiley & Sons.
Maryland Geography, World Atlas.
Maryland State Profile and Energy Estimates, U.S. Energy Information Administration (EIA), 2018.
McLaren, A Numerical and Experimental Study of Unsteady Loading of High Solidity Vertical Axis Wind Turbines, McMaster University, Ontario, Canada (2011).
Mohamed, M., "Impacts of solidity and hybrid system in small wind turbines performance," Energy, vol. 57 (2013), pp. 495-504.
Mohamed, M.H.; "Optimal blade shape of a modified Savonius turbine using an obstacle shielding the returning blade," Energy Conversion and Management, 2011, vol. 52, pp. 236-242.
Mohamed, M.H.; "Optimization of Savonius turbines using an obstacle shielding the returning blade," Renewable Energy, 2010, vol. 35, pp. 2618-2626.
Nakajima, Miyoshi, et al.; "Performance of Double-step Savonius Rotor for Environmentally Friendly Hydraulic Turbine," Journal of Fluid and Science Technology, 2008, vol. 3, DOI:10.1299/jfst.3.410.
Neill et al.; "The impact of tidal stream turbines on large-scale sediment dynamics," Renewable Energy, vol. 34, pp. 2803-2812, 2009; Abstract Only.
Nobile et al.; "Unsteady flow simulation of a vertical axis augmented wind turbine: a two-dimensional study," J. Wind Eng. Ind. Aerod., vol. 125 (2014), pp. 168-179.
Oomen, T., and van der Meulen, S., 2013, "High Performance Continuously Variable Transmission Control Through Robust Control-Relevant Model Validation," ASME Journal of Dynamic Systems, Measurement, and Control, 135(6), p. 061018.
Oomen, T., van der Meulen, S., Bosgra, O., Steinbuch, M., and Elfring, J., 2010, "A Robust-Control-Relevant Model Validation Approach for Continuously Variable Transmission Control," Proceedings of the 2010 American Control Conference, Baltimore, pp. 3518-3523.
O'Rourke et al., "Tidal energy update 2009," Applied Energy, vol. 87, pp. 398-409, 2010.
Orrell et al., "2014 Distributed Wind Market Report," U.S. Department of Energy, Richland, Washington, 2015; Can Not Locate Reference.
Paraschivoiu, I., et al.; , "H-darrieus wind turbine with blade pitch control," Int. J. Rotating Mach., 2009 , pp. 1-7.
Paraschivoiu, I.; "Wind Turbine Design: with Emphasis on Darrieus Concept," Presses inter polytechnique, 2002; Book; Abstract Only.
Payne, A. Kiprakis, M. Ehsan, W. H. S. Rampen, J. Chick, A. Wallace, Efficiency and dynamic performance of digital displacementTM hydraulic transmission in tidal current energy converters, Proceedings of the Institution of Mechanical Engineers, Part A: Journal of Power and Energy 221 (2) (2007) 207-218.
Pesgens, M., Vroemen, B., Stouten, B., Veldpaus, F., and Steinbuch, M., 2006, "Control of a Hydraulically Actuated Continuously Variable Transmission," Vehicle System Dynamics, 44(5), pp. 387-406.
Pfiffner, R., Guzzella, L., and Onder, C., 2003, "Fuel-Optimal Control of CVT Powertrains," Control Engineering Practice, 11(3), pp. 329-336.
Plagge, L. Jestings, B. P. Epps, Next-generation hydrokinetic power take-off via a novel variable-stroke hydraulic system, in: Proceedings of International Conference on Offshore Mechanics and Arctic Engineering, vol. 45547, American Society of Mechanical Engineers, 2014, p. V09BT09A018.
Ponta, F.L., et al.; "On the aerodynamics of variable-geometry oval-trajectory Darrieus wind turbines," Renewable Energy, 2007, vol. 32, pp. 35-56.
Preen, R.J. et al.; "Toward the coevolution of novel vertical-Axis wind turbines," Trans. Evol. Comput., vol. 19 (2) (2015), pp. 284-294.
Pyper, "Large Corporations are Driving America's Renewable Energy Boom," Greentech Media, 2017.
Qian, B. Feng, H. Liu, X. Tian, Y. Si, D. Zhang, Review on configuration and control methods of tidal current turbines, Renewable and Sustainable Energy Reviews 108 (2019) 125-139.
Ragheb, M. et al.; "Vertical Axis Wind Turbines," University of Illinois at Urbana-Champaign, 2008; Can Not Locate Reference.
Ross, M., 1997, "Fuel Efficiency and the Physics of Automobiles," Contemporary Physics, 38(6), pp. 381-394, Abstract Only.
Rourke, F. Boyle, A. Reynolds, Tidal energy update 2009, Applied Energy 87 (2) (2010) 398-409.
Rupp, D., and Guzzella, L., 2010, "Adaptive Internal Model Control With Application to Fueling Control," Control Engineering Practice, 18(8), pp. 873-881, Abstract Only.
Ryu, W., and Kim, H., 2008, "CVT Ratio Control With Consideration of CVT System Loss," International Journal of Automotive Technology, 9(4), pp. 459-465.
Saito, T., and Miyamoto, K., 2010, "Prediction of CVT Transmission Efficiency by Metal V-Belt and Pulley Behavior With Feedback Control," SAE International, https://doi.org/10.4271/2010-01-0855, Abstract Only.
Sangiuliano, Turning of the tides: Assessing the international implementation of tidal current turbines, Renewable and Sustainable Energy Reviews 80 (2017) 971-989.
Savaresi, S. M., Taroni, F. L., Previdi, F., and Bittanti, S., 2004, "Control System Design on a Power-Split CVT for High-Power Agricultural Tractors," IEEE/ASME Transactions on Mechatronics, 9(3), pp. 569-579.
Setlur, P., Wagner, J. R., Dawson, D. M., and Samuels, B., 2003, "Nonlinear Control of a Continuously Variable Transmission (CVT)," IEEE Transactions on Control Systems Technology, 11(1), pp. 101-108.
Shamshirband, D. Petković, A. Amini, N. B. Anuar, V.Nikolić, Ž. Ćo-jbašić, M. L. M. Kiah, A. Gani, Support vector regression methodology for wind turbine reaction torque prediction with powersplit hydrostatic continuous variable transmission, Energy 67 (2014) 623-630; Abstract Only.
Shi, G., Dong, P., Sun, H. Q., Liu, Y., Cheng, Y. J., and Xu, X. Y., 2017, "Adaptive Control of the Shifting Process in Automatic Transmissions," International Journal of Automotive Technology, 18(1), pp. 179-194.
Singh, M. et al.; "Investigation of self-starting and high rotor solidity on the performance of a three S1210 blade H-type Darrieus rotor," Renew. Energy, vol. 76 (2015), pp. 381-387.
Sørensen, et al.; "Drag prediction for blades at high angle of attack using CFD," J. Sol. Energy Eng., vol. 126 (4) (2004), pp. 1011-1016; Abstract Only.
Srivastava, N., and Haque, I., 2009, "A Review on Belt and Chain Continuously Variable Transmissions (CVT): Dynamics and Control," Mechanism and Machine Theory, 44(1), pp. 19-41.
State Energy Consumption Estimates 1960 Through 2016, DOE/EIA—0214(2016), Total Energy Consumption Estimates, Real Gross Domestic Product (GDP), Energy Consumption Estimates per Real Dollar of GDP, Ranked by State, 2016., U.S. Energy Information Administration (EIA), 2017. *different version*.
Sun, Z. X., and Hebbale, K., 2005, "Challenges and Opportunities in Automotive Transmission Control," Proceedings of the 2005 American Control Conference, Portland, pp. 3284-3289.
Sutherland, Herbert J., et al,; "A Retrospective of VAWT Technology," Sandia Report, Sandia National Laboratories, 2012.
Tidal Energy Technology Brief, International Renewable Energy Agency (IRENA), 2014.

(56) References Cited

OTHER PUBLICATIONS

Touimi, M. Benbouzid, P. Tavner, Tidal stream turbines: With or with-out a gearbox?, Ocean Engineering 170 (2018) 74-88; Abstract Only.
Travin et al.; "Physical and numerical upgrades in the detached-eddy simulation of complex turbulent flows," Advances in LES of Complex Flows, Springer, Dordrecht (2002), pp. 239-254; Abstract Only.
Trivellato et al.; "On the Courant-Friedrichs-Lewy criterion of rotating grids in 2D vertical-axis wind turbine analysis," Renew. Energy, vol. 62 (2014), pp. 53-62.
U.S. Department of Energy; Energy Efficiency and Renewable Energy; "20% Wind Energy by 2030, Increasing Wind Energy's Contribution to U.S. Electricity Supply," 2008.
Uihlein et al.; "Wave and tidal current energy—A review of the current state of research beyond technology," Renewable and Sustainable Energy Reviews, vol. 58, pp. 1070-1081, 2016.
US Energy Information Administration, "Renewable energy explained," US Energy Information Administration, 2018.
Van Berkel, K., Hofman, T., Vroemen, B., and Steinbuch, M., 2012, "Optimal Control of a Mechanical Hybrid Powertrain," IEEE Transactions on Vehicular Technology, 61(2), pp. 485-497.
Wakui et al.; "Hybrid configuration of Darrieus and Savonius rotors for stand-alone wind turbine-generator systems," Electr. Eng. Jpn., vol. 150 (4) (2005), pp. 13-22.
Wang et al.; "Numerical investigation on aerodynamic performance of a novel vertical axis wind turbine with adaptive blades," Energy Convers. Manag., vol. 108 (2016), pp. 275-286.
Wang, X. F., and Zhu, W. D., 2016, "Design, Modeling, and Experimental Validation of a Novel Infinitely Variable Transmission Based on Scotch Yoke Systems," ASME Journal of Mechanical Design, 138(1), p. 015001.
Wang, X. F., and Zhu, W. D., 2018, "Design and Stability Analysis of an Integral Time-Delay Feedback Control Combined With an Open-Loop Control for an Infinitely Variable Transmission System," ASME Journal of Dynamic Systems, Measurement, and Control, 140(1), p. 011007.
Wekesa, David Wafula, et al.; "A numerical analysis of unsteady inflow wind for site specific vertical axis wind turbine: A case study for Marsabit and Garissa in Kenya," Renewable Energy, 2015, vol. 76, pp. 648-661.
Wekesa, David Wafula, et al.; "Experimental and numerical study of turbulence effect on aerodynamic performance of a small scale vertical axis wind turbine," J. Wind Eng. Ind. Aerodyn., 2016; vol. 157, pp. 1-4.
Wekesa, David Wafula, et al.; "Influence of operating conditions on unsteady wind performance of vertical axis wind turbines operating within a fluctuating free-stream: A numerical study," J. Wind Eng. Ind. Aerodyn., 2014, vol. 135, pp. 76-89.
Wind energy for rural economic development, U.S. Department of Energy (DOE), Office of Energy Efficiency and Renewable Energy (EERE), DOE/GO-102004-1826, 2014. Can Not Locate Reference.
Wiser et al.; "2014 Wind Technologies Market Report," U.S. Department of Energy, Berkeley, California, 2015.
Xiong, C. R. Berger, Chesapeake bay tidal characteristics, Journal of Water Resource and Protection 2 (7) (2010) 619.
Yildiz, Y., Annaswamy, A. M., Yanakiev, D., and Kolmanovsky, I., 2011, "Spark-Ignition-Engine Idle Speed Control: An Adaptive Control Approach," IEEE Transactions on Control Systems Technology, 19(5), pp. 990-1002.
Yin, Y.-g. Lin, W. Li, H.-W. Liu, Y.-j. Gu, Output power control for hydro-viscous transmission based continuously variable speed wind turbine, Renewable Energy 72 (2014) 395-405.
Yue, D., Tian, E., and Han, Q. L., 2013, "A Delay System Method for Designing Event Triggered Controllers of Networked Control Systems," IEEE Transactions on Automatic Control, 58(2), pp. 475-481.
Zhang, X. M., Han, Q. L., and Han, D. S., 2009 "Effects of Small Time-Delays on Dynamic Output Feedback Control of Offshore Steel Jacket Structures Subject to Wave-induced Forces," Proceedings of the IEEE Conference on Decision and Control, DOI: 10.1109/CDC.2009.5399982.
Zhu, C., Liu, H., Tian, J., Xiao, Q., and Du, X., 2010, "Experimental Investigation on the Efficiency of the Pulley-Drive CVT," International Journal of Automotive Technology, 11(2), pp. 257-261.

* cited by examiner

TIME-DELAY CLOSED-LOOP CONTROL OF AN INFINITELY VARIABLE TRANSMISSION SYSTEM FOR TIDAL CURRENT ENERGY CONVERTERS

CROSS REFERENCE TO RELATED APPLICATIONS

This application is a continuation-in-part of, and claims priority to, U.S. patent application Ser. No. 17/684,507 filed on Mar. 9, 2022 in the name of Weidong Z H U et al. and entitled "Closed-Loop Control of an Infinitely Variable Transmission," which is a divisional of U.S. patent application Ser. No. 17/232,225 filed on Apr. 16, 2021, now U.S. Pat. No. 11,268,615, which claim priority to U.S. Provisional Patent Application No. 63/010,928 filed on Apr. 16, 2020, all of which are incorporated by reference herein in their entirety. This application is also a continuation-in-part of, and claims priority to, U.S. patent application Ser. No. 16/851,602 filed on Apr. 17, 2020 in the name of Meilin Y U et al. and entitled "Hybrid Vertical Axis Turbine Apparatus," now U.S. Pat. No. 11,313,348, which claims priority to U.S. Provisional Patent Application No. 62/835,061 filed on Apr. 17, 2019, both of which are incorporated by reference herein in their entirety.

FIELD

The present invention relates to a tidal current energy converter (TCEC) comprising (a) at least one infinitely variable transmission (IVT), wherein the IVT comprises at least one IVT control system, and (b) at least one vertical axis wind (or water) turbine.

BACKGROUND OF THE INVENTION

Oceans are vast and abundant sources of diverse types of renewable energy, which can contribute to energy security and greenhouse gas emission reduction worldwide [Edenhofer, 2011; Sgobbi, 2016]. Tidal current harvesting technologies, which are designed to harvest the kinetic energy of tidal currents, is a new development tendency of marine energy harvesting technologies [Uihlein, 2016]. A significant advantage of tidal current energy is that it can be almost perfectly forecasted over a long time [Sangiuliano, 2017]. Thus, incorporating tidal current energy generation into an electricity system should be more stable than other forms of renewable generation that are relatively unpredictable [Denny, 2009]. Additionally, tidal currents are hardly affected by weather conditions [Everett, 2012]. While tidal current energy converters (TCECs) have made great progress in commercial development in the last decade, the tidal current energy industry has suffered many serious technical and commercial setbacks [Johnstone, 2013; Segura, 2017]. Working principles and structures of TCECs are similar to those of wind turbines [Johnstone, 2013; Segura, 2017]. Both devices can convert the kinetic energy of fluid into electrical power. It is known that a TCEC starts working when the tidal speed reaches a minimum speed called the cut-in speed and continues generating electricity up to a specific tidal speed called the rated speed, where the maximum power is produced by its generator. Current TCECs require the tidal speed higher than 2.25 m/s, which corresponds to water depths between 25 and 50 m to yield much more practical power with a larger swept area of turbine blades and a high tidal speed [Laws, 2016]. However, only less than 2% of sea regions with high tidal speeds can satisfy the requirement of the existing TCECs [Haas, 2011; Lewis, 2015]. Since the density of seawater is high, which is more than 800 times of the air density, tidal currents can generate a considerable amount of energy with low tidal speeds (1.0-1.5 m/s) [Funke, 2016]. Sea regions with those low tidal speed are widely distributed along the United States continental shelf edge, which account for more than 70% of available sea space [Haas, 2011].

TCECs consist of three key components, i.e., rotors with a number of turbine blades, transmissions, and generators [Frid, 2012]. Rotors rotate with the hydrodynamic effect of tidal currents. Transmissions convert low rotation speeds of the rotors to high rated speeds of generators. The electrical power can be generated by generators. Shafts of rotors and generators are directly coupled via mechanical gearboxes or indirectly coupled via hydraulic transmissions [Plagge, 2014; Mahato, 2019]. These three key components can be mounted on a tower structure or a floating structure to withstand harsh environmental loads. There are two common types of transmissions traditionally used for TCEC applications, i.e., mechanical gearboxes [Touimi, 2018] and hydraulic transmissions [Payne, 2007; Liu, 2011]. Both are hampered by a number of disadvantages which limit the use of TCECs comprising same to very specific, and less relevant, applications.

To improve dynamic performance and efficiency of fluid turbine and automotive applications, some types of automatic transmissions, e g , infinitely variable transmissions (IVTs), are being used [Wang, 2018; Wang, 2016; Ross, 1997; Manwell, 2010]. A basic function of automatic transmissions is to smoothly and efficiently convert the torque from a prime mover, such as an engine, to an application part with a continuous output-to-input speed ratio. An IVT uses all gear contact to achieve a continuously variable speed ratio, where the output-to-input speed ratio ranges from zero to a certain value. Disadvantageously, prior art IVTs have not adequately achieved a continuously varied speed ratio from zero without decreasing the transmission efficiency and reliability. Further, prior art IVTs do not adequately operate at high frequency without encountering difficulties in controlling the engagement of the gears. Additionally, problems of efficiency, durability, compactness, variability of the peak-to-peak instantaneous output speed variations, torque limitations, and vibrations continue be evident in prior attempts. Further, in cam-based IVTs, it is not possible to use non-circular gears since it results in phase changes.

An IVT using two scotch yoke systems and a noncircular gear pair was designed in [Wang, 2016] to generate a continuously variable output-to-input speed ratio. Since the IVT converts the torque by contact forces instead of the friction force, the minimum speed ratio of the IVT can be zero and the variable range of the speed ratio is larger than that of CVTs. The larger variable range of the speed ratio of the IVT allows the prime mover to virtually operate in the optimal speed region that is independent the speed of the application part to maximize fuel efficiency. Hence, the speed ratio of the IVT highly depends on the speed of the prime mover. The prime goal of a control system of the IVT is to operate the speed of the prime mover to an optimal value for high dynamic performance and fuel efficiency.

The present invention relates to a TCEC comprising (a) an IVT comprising a nonlinear closed-loop control combined with an integral time-delay feedback control for TCEC applications under high-torque and low-speed conditions, and (b) a hybrid Darrieus-Modified-Savonius (HDMS) vertical axis wind (or water) turbine (VAWTs) apparatus.

SUMMARY OF THE INVENTION

In one aspect, a tidal current energy converter (TCEC) is described comprising: (i) at least one infinitely variable transmission (IVT) comprising an IVT control system comprising a crank length controller, a forward speed controller, or both; and (ii) at least one vertical axis water turbine (VAWT).

In another aspect, a tidal current energy converter (TCEC) is described comprising: (i) at least one infinitely variable transmission (IVT) comprising an IVT control system comprising a crank length controller, a forward speed controller, or both; and (ii) at least one vertical axis water turbine (VAWT), wherein the IVT control system comprises:

a crank length controller comprising electronic components configured to:
 determine a desired output rotation speed of an infinitely variable transmission; and
 determine a control signal for a crank length control mechanism based on the determined output rotation speed; and
a crank length control mechanism configured to receive the control signal and control the crank length of the infinitely variable transmission based on the control signal.

In still another aspect, a tidal current energy converter (TCEC) is described comprising: (i) at least one infinitely variable transmission (IVT) comprising an IVT control system comprising a crank length controller, a forward speed controller, or both; and (ii) at least one vertical axis water turbine (VAWT), wherein the IVT control system comprises:

an input-control module configured to control a motion conversion module of an infinitely variable transmission; and
a forward speed controller comprising electronic components configured to:
 determine a crank length for the infinitely variable transmission, a desired modulated input speed of the input-control module, and an output torque of an output shaft of the infinitely variable transmission; and
 output a control signal to the input-control module based on the determined crank length, the desired modulated input speed, and the output torque.

In yet another aspect, a tidal current energy converter (TCEC) is described comprising: (i) at least one infinitely variable transmission (IVT) comprising an IVT control system comprising a crank length controller, a forward speed controller, or both; and (ii) at least one vertical axis water turbine (VAWT), wherein the VAWT is a hybrid VAWT comprising a modified-Savonius (MS) rotor in a central region around a central axis and a straight bladed H-type Darrieus rotor in an annular region surrounding the MS rotor.

In another aspect, a tidal current energy converter (TCEC) is described comprising: (i) at least one infinitely variable transmission (IVT) comprising an IVT control system comprising a crank length controller, a forward speed controller, or both; and (ii) at least one vertical axis water turbine (VAWT), wherein the VAWT is a hybrid VAWT comprising:

(a) a first rotor system positioned in a central region and rotatable about a central axis, wherein the first rotor system comprises: a plurality of first blades, each having a concave shape that allows fluid to push on a concave side of each first blade; and a hydraulic brake system that is mounted upon the shaft with bearings; and (b) a second rotor system positioned in an annular region surrounding the first rotor system in the central region, wherein the second rotor system comprises a plurality of second blades spaced about the central axis, wherein the cross-section of each second blade is a substantially symmetrical airfoil shape.

In still another aspect, a tidal current energy converter (TCEC) is described comprising: (i) at least one infinitely variable transmission (IVT) comprising an IVT control system comprising a crank length controller, a forward speed controller, or both; and (ii) at least one vertical axis water turbine (VAWT), wherein the VAWT is a hybrid VAWT comprising:

(a) a first rotor system positioned in a central region and rotatable about a central axis, wherein the first rotor system comprises:
 (i) at least two blade-sets stacked vertically along the central axis, each blade-set comprising a plurality of first blades that are spaced about the central axis, wherein the at least two blade-sets are mounted upon a shaft with bearings along the central axis, wherein each first blade extends from a position proximate to the central axis out to a position distal to the central axis and has a concave shape that allows fluid to push on a concave side of each first blade, and
 (ii) a hydraulic brake system that is mounted upon the shaft with bearings; and (b) a second rotor system positioned in an annular region surrounding the first rotor system in the central region, wherein the second rotor system comprises a plurality of second blades spaced about the central axis, wherein each of the second blades is positioned substantially parallel to the central axis and attached to at least one blade-set of the first rotor system using at least two supporting struts, wherein the cross-section of the second blade is a substantially symmetrical airfoil shape.

Other aspects, features and embodiments of the invention will be more fully apparent from the ensuing disclosure and appended claims.

DETAILED DESCRIPTION, AND PREFERRED EMBODIMENTS THEREOF

Figure 1A:
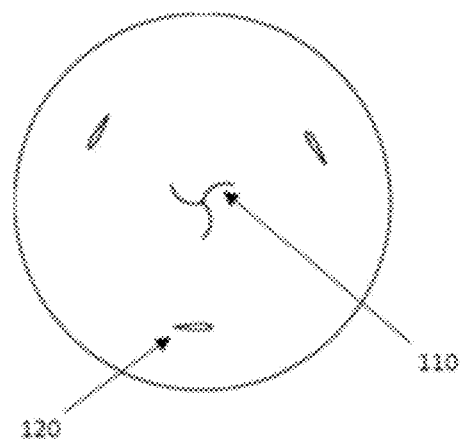
FIG. 1A is a schematic of a 2D HDMS-type VAWT.

The present invention relates to a TCEC comprising (a) at least one infinitely variable transmission (IVT), wherein the IVT comprises at least one IVT control system, and (b) at least one vertical axis wind (or water) turbine.

As used herein, the term "infinitely variable" embraces, but is not limited to, a transmission which is capable of operating at a plurality of gear ratios and in which the plurality of gear ratios are changeable in very small, possibly infinitely small, increments over a range of gear ratios. "IVT" is not intended to imply that an infinite rotation speed may be achieved, which, of course, would be impossible, only that a theoretically infinite number of ratios between the speed of the input shaft and the speed of the output shaft may be selected within a predetermined range of ratios. It should also be noted that the output shaft of IVT does not actually operate within a set range of speeds but actually operates within a range of ratios.

As defined herein, a "body of water" includes, but is not limited to, a bay, a bayou, a canal, a channel, a cove, a creek, a delta, an estuary, a fjord, a gulf, a harbor, an inlet, a lake, a mill pond, an ocean, a pond, a reservoir, a river, a sea, a sound, a strait, a stream, and a tide.

As defined herein, a "fluid" can be wind or water.

As defined herein, "bearings" include at least one of ball bearings, air bearings, and magnetic levitation bearings.

As well-known in the art, "tip speed ratio" or "TSR" is defined as the ratio between the rotating speed at the tip of the rotor and the incoming fluid speed.

As defined herein, the "self-starting" capability of a VAWT is defined as that the fluid turbine can reach the desirable TSRs under nominal wind conditions without external load. As a result, the turbines can effectively harvest fluid energy when appropriate energy collectors (in the form of external load) are activated.

As defined herein, the individual gears in the "pair of meshed gears" or "gear pair" in the IVT can be substantially circular or noncircular. In one embodiment, the gear pair comprises two substantially circular gears that mesh. In another embodiment, the gear pair comprises two noncircular gears that mesh. It should be understood by the person skilled in the art that a "substantially circular" gear is intended to be perfectly circular however minor manufacturing errors occurred.

As defined herein, a "prime mover" includes, but is not limited to, an internal combustion engine, hydro-turbine, wind turbine, electric motor, gas turbine, and waterwheel.

Vertical Axis Wind (or Water) Turbines

Typically fluid (wind or water) turbines are classified into horizontal axis wind (or water) turbines (HAWTs) and vertical axis wind (or water) turbines (VAWTs) depending on the direction of the axis of rotation. Though the utility-scale HAWTs are more commonly used in wind farms due to their higher power generation capacity than that of VAWTs, VAWTs have advantages over HAWTs. Specifically, they are omni-directional, indicating that they can operate under different fluid directions without using complex yaw mechanisms. They are usually less sensitive to wake effects compared to HAWTs [Danao, 2013; Danao, 2014; Wekesa, 2014; Wekesa, 2015; Wekesa, 2016]. Appropriately designed VAWTs can effectively harvest wind or water energy at both very low (e.g., ≤1 m/s) and very high (e.g., ≥25 m/s) speeds. As a result, VAWTs are attractive for deployment in both urban and rural areas, and in offshore regions [Paraschivoiu, 2022; Islam, 2008]. Moreover, VAWTs usually have low noise emission and low radar signatures and are easy to install and maintain.

There exists a great degree of versatility in the design of VAWTs. Traditionally, VAWTs can be classified into two dominant types, namely, Darrieus and Savonius type wind turbines. The Darrieus VAWT is a lift-driven fluid turbine, and usually has high energy harvesting efficiency at relatively large tip speed ratios (TSRs). However, the Darrieus VAWT suffers from self-starting issues due to the dead band of negative torque at small TSRs [Baker, 1983; Kirkle, 1991; Li, 2013; Bazilevs, 2014; Buchner, 2015], although some authors have reported unaided start-up in a steady wind [Dominy, 2007; Hill, 2009]. The Savonius VAWT falls into the category of drag-driven fluid turbines. It is self-starting, and works well at small TSRs [Nakajima, 2008; Kamoji, 2009], however, disadvantageously the energy harvesting efficiency is traditionally much lower than that of the Darrieus VAWT.

None of these VAWT designs in the prior art can simultaneously resolve the many technical challenges, including self-starting, high energy efficiency, and structural stability, at realistic wind and tidal speeds. Towards that end, the present invention broadly relates to a TCEC comprising a new hybrid Darrieus-Modified-Savonius (HDMS) VAWT apparatus. In the HDMS VAWT design, an MS rotor is located in the center of a straight-bladed H-type Darrieus rotor to simultaneously enhance the self-starting capability, using the MS rotor, and maintain high energy harvesting efficiency, using the Darrieus rotor. The multi-stage HDMS VAWT can harvest aero-hydro energy efficiently under a wide range of flow conditions, while also providing good self-starting properties and enhanced structural stability.

Broadly, the TCEC described herein comprises a hybrid VAWT comprising a modified-Savonius (MS) rotor in the central region and a straight bladed H-type Darrieus rotor in the surrounding annular region (see FIGS. 1A and 1B), referred to hereinafter as the hybrid Darrieus-Modified-Savonius (HDMS) VAWT. The hybrid design represents a nonlinear interaction between the MS rotor and the Darrieus rotor. The HDMS VAWT described herein can be used to harvest energy using any fluid motion, including water and air motion (i.e., wind).

With regards to the MS rotor 10 in the central region, said MS rotor comprises a plurality of blade-sets 140 or stages, stacked upon one another and rotatable about a common, central axis, wherein each blade-set comprises a first (i.e., top) and second (i.e., bottom) circular plate 100, each plate being substantially perpendicular to the common axis. The common axis is transverse to the flow of the fluid medium. Each blade-set or stage comprises a plurality of rectangular blades or sails 110, each of which is substantially the same size, emanating from the common axis and rigidly attached to the first and second circular plates. For example, the blade-set can comprise two, three, four, or more blades or sails. In one embodiment, the blade-set comprises three blades or sails arranged at approximately 120 degree angles from each other around the common axis. Each rectangular blade has a blade length and a blade height, wherein the blade height is equal to the distance between the first and second circular plates in the blade-set. Each blade in the blade-set is attached along the blade length to the first and second circular plates from the common axis to a position proximate to an edge of the circular plates, wherein the blade length is greater than the radius of the circular plates, such that the blade has to be bent or arced along the blade length to fit. In one embodiment, the blade length is about 20% to 60% longer than the radius of the circular plate, preferably about 40% to about 60%. It should be appreciated that an edge of each blade may be aligned with an edge of the circular plates, or an edge of each blade may be inset a nominal distance from the edge of the circular plates, or an edge of each blade may be outset a nominal distance from the edge of the circular plates.

Each blade-set is rotated relative to the next blade-set such that the second blade set is offset relative to the first. For example, the second blade-set is rotated approximately 20-60 degrees from the first, and the third is still another approximately 20-60 degrees behind the second or approximately 40-120 degrees behind the first. It should be appreciated by the person skilled in the art that the MS rotor of the apparatus can comprise one, two, three, four, five, or more blade-sets, and that each blade-set can have substantially the same, or different, height relative to another blade-set. Further, each blade-set can comprise the same number, or a different number, of blades as the other blade-sets making up the MS rotor portion of the HDMS VAWT. The MS rotor in the central region can be built in either clockwise or anti-clockwise parities such that it rotates about the central axis in a clockwise manner or a counter clockwise manner. In one embodiment, the common axis comprises a shaft. In one embodiment, the shaft is static, or non-rotating, with the overall blade-set assembly mounted upon and rotating about the non-rotating shaft on bearings or bushings. In one embodiment, the shaft is rotatable, wherein the blade-set assembly is attached to the rotatable shaft, and the rotating shaft rotates about the central axis, as understood by the person skilled in the art. The MS rotor can further comprise a brake system, for example a hydraulic brake system, that is mounted upon the shaft with bearings to limit the rotational speed of the rotor assembly to a maximum speed at high fluid speeds, as readily determined by the person skilled in the art.

It should be appreciated that although the MS rotor portion of the HDMS VAWT was disclosed as comprising a first and second circular plate per plate-set, one plate-set can share a circular plate with another plate-set, for example, the second plate of a first blade-set can be the first plate of a second blade-set. Further, it is contemplated that instead of, or in addition to, using a full circular plate, the arcuate portions of the blades can instead be "capped" 150 off instead, for example as illustrated in FIG. 1C, which is a top view of a set of MS blades 110 of a blade-set. It should be appreciated that there can be one or two caps associated with the arcuate portions of the blades of a blade-set, meaning that only the top of the blades are capped, only the bottom of the blades are capped, or both the top and the bottom of the blades are capped, depending on the achievement of the greatest harvesting efficiency.

With regards to the Darrieus rotor 20 in the surrounding annular region, preferably the Darrieus rotor is a straight bladed H-type Darrieus rotor, although it should be appreciated that a helical-type and the semicircular-type Darrieus rotor is contemplated for use in the HDMS VAWT disclosed herein. The straight-bladed H-type Darrieus rotor comprises a plurality of blades 120 that can rotate about the common axis. In one embodiment, the cross-section of the blade 120 is of a substantially symmetrical airfoil shape, although non-symmetrical airfoil blade shapes can be used. For example, a NACA 0015 airfoil blade design has generally a wide, round leading edge and a squat parabolic length in cross-section and is defined in part by a chord length, c. It should be appreciated that the shape of the airfoil blades can be adjusted as needed depending on the given fluid power generation requirements, as readily understood by the person skilled in the art. The plurality of blades is rigidly held in a position substantially parallel to the common axis. In one embodiment, each blade is attached to the blade-sets of the MS rotor using a plurality of supporting struts 130. In one embodiment, each blade is preferably positioned substantially equiangular around the common axis. The Darrieus rotor of the HDMS VAWT can comprise two, three, four, or more blades positioned around the common axis.

Figure 1B:
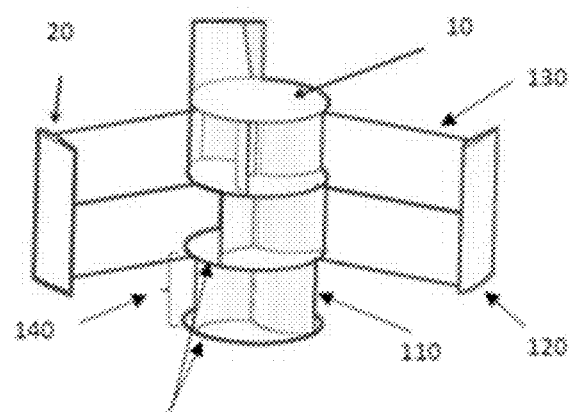
FIG. 1B is a schematic of a 3D model of the HDMS-type VAWT.
Figure 1C:
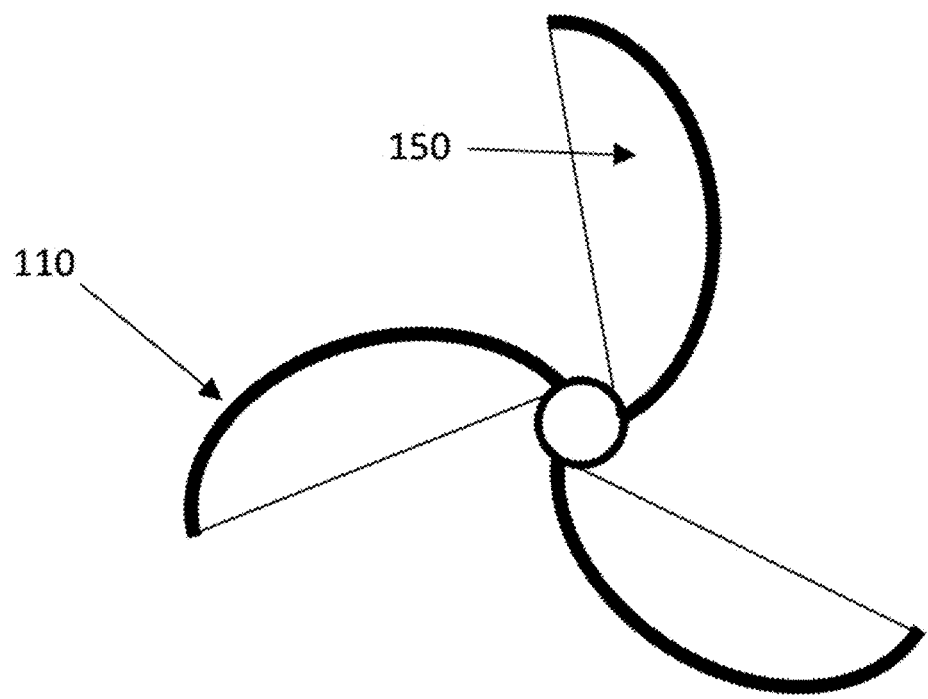
FIG. 1C illustrates a top view of an alternative to using a full circular plate, instead capping just the arcuate portions of the blade.

As shown in FIG. 1B, the Darrieus rotor blades 120 are not the same longitudinal length (along the common axis) as the cumulative length of the three blade-sets 140. FIG. 1B is not intended to limit the instant invention in any way; there may be more or less than three blade-sets 140, more or less than three blades 110 per blade-set 140, more or less than three Darrieus rotor blades 120, and the length of the Darrieus rotor blades 120 can be the more than, less than, or equal to the cumulative length of the blade-sets of the MS rotor portion, as readily understood by the person skilled in the art. Preferably, the MS rotor portion and the Darrieus rotor portion are both arranged such that they are symmetrical around the common axis.

Figure 2:
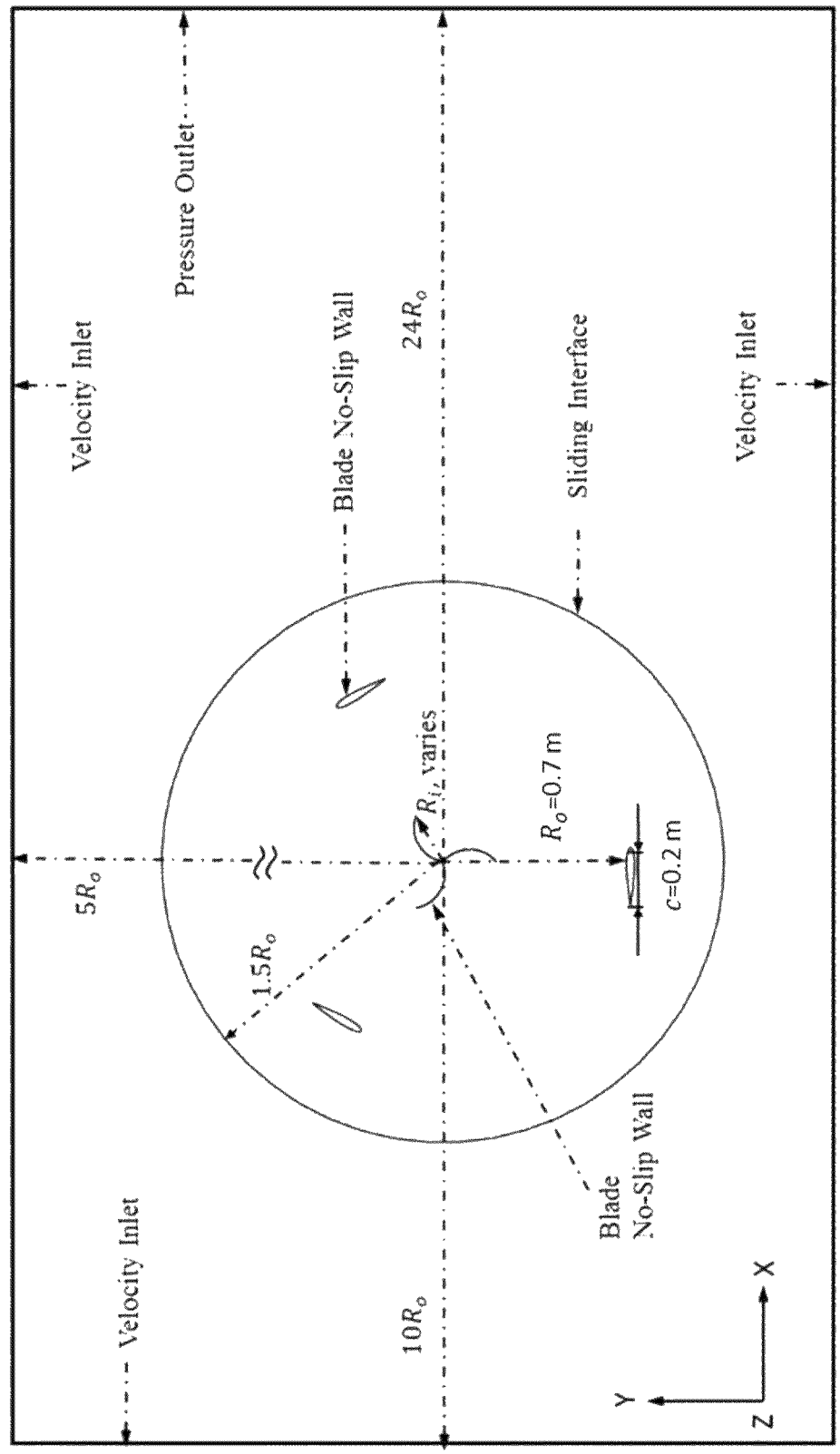
FIG. 2 was a schematic illustration of the computational domain and boundary conditions.

An embodiment of the HDMS VAWT is shown in FIG. 2, wherein the tip of the blade 110 in the MS rotor (wherein the blade intersects with the edge of the circular plates) was aligned with an aerodynamic center of the corresponding blade 120 in the Darrieus rotor. It should be appreciated that the relative position between a blade of the inner MS rotor and a blade of the outer Darrieus rotor can be adjusted relative to that illustrated in FIG. 1B, for example in a range of +/−1° to 90° relative to the alignment with the aerodynamic center of the Darrieus blade, as readily determined by the person skilled in the art. The ratio of the radius $R_o$ of the Darrieus rotor blades 120 relative to the radius $R_i$ of the MS rotor blades 110 is in a range from about 1.5 to about 4, preferably about 1.5 to about 3.5, and even more preferably about 2.5 to about 3.5. The ratio of the radius $R_o$ of the Darrieus rotor blades 120 relative to the chord length, c, of the Darrieus blades is in a range from about 1.5 to about 4, preferably about 1.5 to about 3.5, and even more preferably about 2.5 to about 3.5. In one embodiment, the radius $R_i$ of the MS rotor blades 110 is substantially the same as the chord length, c, of the Darrieus blades. In another embodiment, the radius $R_i$ of the MS rotor blades 110 is greater than the chord length, c, of the Darrieus blades. In still another embodiment, the radius $R_i$ of the MS rotor blades 110 is less than the chord length, c, of the Darrieus blades. The preferred radius $R_i$ of the MS rotor blades relative to the chord length, c, of the Darrieus blades is dependent on when the energy harvesting efficiency is maximized, as readily determined by the person skilled in the art. In a preferred embodiment, the energy harvesting efficiency is achieved at TSR values greater than about 1.5, preferably greater than about 2.0, and most preferably greater than about 2.2.

In one embodiment, each HDMS VAWT comprises suitable self-lubricating bushings (not shown) (e.g., bearings) to help reduce rotational friction, vibration, and noise. In one embodiment, a suitable alternator, such as, for example, a direct drive permanent magnet alternator can be used to collect and convert the rotational energy power of fluid, as harnessed by the present HDMS VAWT, into electrical energy, as readily understood by the person skilled in the art. The components of the HDMS VAWT comprise at least one of carbon composites, aluminum, and polymer materials, although other materials are contemplated. An embodiment of how the MS rotor portion of the HDMS VAWT can be found in U.S. Pat. No. 8,790,069 in the name of Bruce Elliott Anderson, which is hereby incorporated in its entirety herein.

Accordingly, in a first aspect, a hybrid vertical axis wind (or water) turbine apparatus is disclosed, said apparatus comprising a modified-Savonius (MS) rotor in the central region and a straight bladed H-type Darrieus rotor in the surrounding annular region. In one embodiment, the hybrid vertical axis wind (or water) turbine apparatus comprises:

(a) a first rotor system positioned in a central region and rotatable about a central axis, wherein the first rotor system comprises: a plurality of first blades, each having a concave shape that allows fluid to push on a concave side of each first blade; and a hydraulic brake system that is mounted upon the shaft with bearings; and (b) a second rotor system positioned in an annular region surrounding the first rotor system in the central region, wherein the second rotor system comprises a plurality of second blades spaced about the central axis, wherein the cross-section of each second blade is a substantially symmetrical airfoil shape.

In one embodiment, the first rotor system comprises at least two blade-sets stacked vertically along the central axis, each blade-set comprising a plurality of first blades that are spaced about the central axis, wherein the at least two blade-sets are mounted upon a shaft with bearings along the central axis, wherein each first blade extends from a position proximate to the central axis out to a position distal to the central axis. In one embodiment, the plurality of first blades are equiangularly spaced about the central axis. With regards to the first rotor system, in one embodiment, each blade-set comprises a circular top plate and a circular bottom plate, wherein the circular plates are substantially perpendicular to the central axis, and wherein the plurality of first blades are positioned therebetween. In one embodiment, one plate-set can share a circular plate with another plate-set. In one embodiment, each blade-set comprises three first blades located at approximately 0 degrees, 120 degrees, and 240 degrees about the central axis. In one embodiment, each first blade is rectangular and has a first blade length and a first blade height, wherein the first blade height is equal to the distance between the circular top and bottom plates in the blade-set. In one embodiment, each first blade in the blade-set is attached along the first blade length to the top and bottom circular plates from the central axis to a position proximate to an edge of the circular plates, wherein the first blade length is greater than the radius of the circular plates, such that each first blade has to be bent or arced along the first blade length to fit, resulting in the concave shape, upon rigid positioning in the blade-set. An edge of each first blade may be aligned with an edge of the circular plates, or an edge of each first blade may be inset a nominal distance from the edge of the circular plates, or an edge of each first blade may be outset a nominal distance from the edge of the circular plates. In one embodiment, the first blades in each blade-set are offset about 20-60 degrees about the central axis from the first blades in each other blade-set. With regards to the second rotor system, in one embodiment, the plurality of second blades are straight-bladed. In one embodiment, the plurality of second blades are equiangularly spaced about the central axis. In one embodiment, each of the second blades is positioned substantially parallel to the central axis and attached to at least one blade-set of the first rotor system using at least two supporting struts. In one embodiment, the shaft can be a static non-turning shaft, and the first rotor system is mounted upon, and rotates around, the static non-turning shaft. In one embodiment, the shaft can be a rotating shaft, and the first rotor system is attached to the rotating shaft, and the rotating shaft rotates about the central axis. Preferably, the greatest energy harvesting efficiency is achieved at a tip speed ratio (TSR) values greater than about 2.0, preferably greater than 2.2.

In another embodiment, the hybrid vertical axis wind (or water) turbine apparatus of the first aspect comprises:

(a) a first rotor system positioned in a central region and rotatable about a central axis, wherein the first rotor system comprises:
  (i) at least two blade-sets stacked vertically along the central axis, each blade-set comprising a plurality of first blades that are spaced about the central axis, wherein the at least two blade-sets are mounted upon a shaft with bearings along the central axis, wherein each first blade extends from a position proximate to the central axis out to a position distal to the central axis and has a concave shape that allows fluid to push on a concave side of each first blade, and
  (ii) a hydraulic brake system that is mounted upon the shaft with bearings; and
(b) a second rotor system positioned in an annular region surrounding the first rotor system in the central region, wherein the second rotor system comprises a plurality of second blades spaced about the central axis, wherein each of the second blades is positioned substantially parallel to the central axis and attached to at least one blade-set of the first rotor system using at least two supporting struts, wherein the cross-section of the second blade is a substantially symmetrical airfoil shape.

With regards to the first rotor system, in one embodiment, each blade-set comprises a circular top plate and a circular bottom plate, wherein the circular plates are substantially perpendicular to the central axis, and wherein the plurality of first blades are positioned therebetween. In one embodiment, one plate-set can share a circular plate with another plate-set. In one embodiment, the plurality of first blades are equiangularly spaced about the central axis. In one embodiment, each blade-set comprises three first blades located at approximately 0 degrees, 120 degrees, and 240 degrees about the central axis. Each first blade is rectangular and has a first blade length and a first blade height, wherein the first blade height is equal to the distance between the circular top and bottom plates in the blade-set. In one embodiment, each first blade in the blade-set is attached along the first blade length to the top and bottom circular plates from the central axis to a position proximate to an edge of the circular plates, wherein the first blade length is greater than the radius of the circular plates, such that each first blade has to be bent or arced along the first blade length to fit, resulting in the concave shape, upon rigid positioning in the blade-set. An edge of each first blade may be aligned with an edge of the circular plates, or an edge of each first blade may be inset a nominal distance from the edge of the circular plates, or an edge of each first blade may be outset a nominal distance from the edge of the circular plates. In one embodiment, the first blades in each blade-set are offset about 20-60 degrees about the central axis from the first blades in each other blade-set. With regards to the second rotor system, in one embodiment, the plurality of second blades are straight-bladed. In one embodiment, the plurality of first blades are equiangularly spaced about the central axis. In one embodiment, the shaft can be a static non-turning shaft, and the first rotor system is mounted upon, and rotates around, the static non-turning shaft. In one embodiment, the shaft can be a rotating shaft, and the first rotor system is attached to the rotating shaft, and the rotating shaft rotates about the central axis. Preferably, the greatest energy harvesting efficiency is achieved at a tip speed ratio (TSR) values greater than about 2.0, preferably greater than 2.2.

Advantageously, it was surprisingly discovered that an MS rotor with an appropriate size, when mounted in the center of a Darrieus rotor, to yield the hybrid VAWT turbine design described herein, can enhance the self-starting capability of the wind turbine system, and facilitate its acceleration to a large TSR, thus maintaining a relatively high energy harvesting efficiency under external load. Other advantages discussed herein include, but are not limited to:

(a) The MS VAWT has better self-starting capability compared with the Darrieus one, especially at low wind speed. The larger the size of the inner MS rotor is, the better the observed self-starting performance. However, the inner MS rotor can also adversely affect the final angular velocity of the VAWTs. Specifically, the rotation speed that the HDMS VAWTs can reach at the end of acceleration decreases when the size of the inner MS rotor increases;

(b) For a given moment of inertia that supports self-startup under free load, the final angular velocity of both MS and HDMS VAWTs under external load decreases when the damping factor increases;

(c) For each type of VAWTs studied, there exists an optimum damping factor which can result in the maximum power coefficient. It was found that for the MS VAWT, the best energy harvesting performance was achieved at a small TSR (i.e., around 1.2);

(d) From a measurement of the aerodynamic moment acting on different components of the HDMS VAWTs, it was found that the energy was harvested mainly by the Darrieus blades when the turbines work at the optimum TSR. The wind moment acting on the inner MS rotor increases when its size increases; while at the same time, the wind moment acting on the Darrieus blades significantly decreases due to the interaction between the MS and Darrieus blades. This results in a drop of the total energy harvest efficiency;

(e) Preliminary simulation research findings indicate that the HDMS VAWT described herein can continuously harvest wind energy in a wide range of wind speeds (e.g., 1 m/s to 25 m/s), all while providing excellent self-starting capability;

(f) The HDMS VAWT disclosed herein has enhanced stability, even at high wind speeds, due to the added stiffness by the inner modified Savonius rotor. The HDMS design can reduce structural vibration, thus leading to longer turbine operating lifetime.

In a second aspect, the present invention relates to a method of using the hybrid vertical axis wind (or water) turbine apparatus of the first aspect to convert the potential energy of wind to mechanical/rotational energy and eventually to electrical energy. It should be appreciated that the common central axis of the HDMS VAWT can be arranged to be vertical or horizontal, relative to any surface, for example, the ground or structure, that the apparatus is being placed on.

In a third aspect, the present invention relates to a method of using the hybrid vertical axis wind (or water) turbine apparatus of the first aspect to convert the potential energy of water in a body of water to mechanical/rotational energy and eventually to electrical energy. It should be appreciated that the common central axis of the HDMS VAWT can be arranged to be vertical or horizontal, relative to the surface plane of the body of water.

Figure 3:
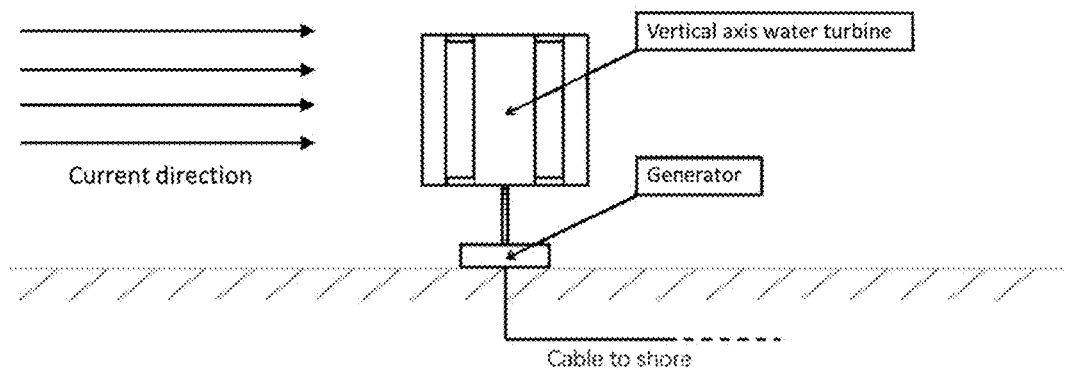
FIG. 3 is a schematic diagram of tidal energy harvesting, wherein the HDMS VAWT is positioned vertically relative to the surface plane of the body of water.

Generally, harvesting water energy is similar to harvesting wind energy. In one embodiment, the vertical axis water turbine can be substantially, or fully, immersed in a body of water and the current will drive the turbine to rotate to generate mechanical/rotational energy (see, FIG. 3).

In one embodiment of the third aspect, tidal current energy is harvested using the HDMS VAWT of the first aspect. The commercialization potential for tidal energy is larger than that for other ocean energy since it can be almost perfectly forecasted over a long-time horizon and is hardly influenced by weather conditions [Uihlein, 2016]. Energy can be generated both day and night. There are vast but untapped tidal energy resources with lower tidal current speeds (1.0~1.5 m/s) along the U.S. continental shelf edge. The HDMS VAWT described herein will provide improved turbine efficiency, leading to a significant increase in energy yield. In one embodiment, the HDMS VAWT technology described herein is used to harvest hydrokinetic energy at low tidal current speeds.

Figure 4:
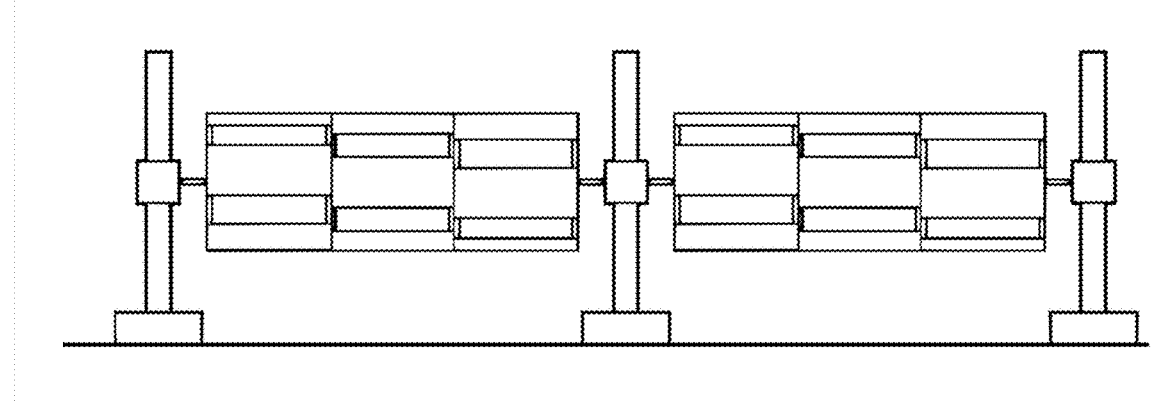
FIG. 4 is a schematic of a proposed arrangement of a plurality of HDMS VAWT apparatuses in a "fence."

FIG. 4 is a schematic of a proposed arrangement of a plurality of HDMS VAWT apparatuses in a "fence," wherein each HDMS VAWT is separated from the other ones by a post. This is advantageous when the HDMS VAWT apparatus is positioned horizontally relative to the surface plane of the body of water, a building or any other surface such as the ground. In one embodiment, the HDMS VAWT apparatuses are fully submerged under the surface of the water. In one embodiment, the HDMS VAWT apparatuses and the posts are fully submerged under the surface of the water. In one embodiment, the HDMS VAWT apparatuses (and posts) are partially submerged in the water. The number of posts can be minimized, and the posts can be used to incorporate at least some of the mechanisms needed to convert the rotational energy to electrical energy. Preferably, the posts are substantially water resistant.

Infinitely Variable Transmission

The present inventors previously introduced an IVT in [Wang, 2016], which mechanically transmitted a variable input speed to a desired constant output speed with a continuously variable speed ratio. The continuously variable speed ratio of the IVT was adjustable by changing the crank length in the scotch yoke systems (SYSs). The noncircular gear pair was designed to eliminate speed variations of the output speed of the IVT. Advantageously, the IVT designed in [Wang, 2016] can be used for high-torque and low-speed conditions, which can allow a TCEC to virtually operate in its optimal speed range that is independent of the speed of the hydro-turbine to maximize harvesting efficiency. Since the IVT can provide a continuously variable speed ratio, it can ensure high-efficiency performance of a hydro-turbine with a variable tidal current speed. To achieve maximum efficiency over most of the working range of the hydro-turbine, it should operate at a particular value of the tip-speed ratio (TSR). The control strategy of the IVT can be achieved by accurately tracking a prescribed speed ratio reference and simultaneously reducing instantaneous fluctuations of the output speed based on the TSR of the hydro-turbine and the desired output speed of the IVT.

High operation performance of IVTs can be achieved by accurately tracking a prescribed input-to-output speed ratio reference and simultaneously reducing instantaneous variations of the input-to-output speed ratio of the IVT. Towards that end, an IVT comprising a nonlinear input-to-output speed ratio control combined with an integral time-delay feedback control is described herein, wherein the input-to-output speed ratio of the IVT system is adjusted for a desired constant output rotational speed with any input and output load. In one embodiment, the input-to-output speed ratio control for the IVT system can comprise a forward speed controller for varying operating conditions, such as input speed and speed ratio changes. In one embodiment, the input-to-output speed ratio control for the IVT system can comprise a crank length controller for varying operating conditions, such as input speed and speed ratio changes. Using the presently described IVT, input-to-output speed ratios of the IVT can achieve an excellent tracking response for the desired constant output rotation speed and reduce speed fluctuations of the output speed of the IVT by the time-delay feedback control. Further, using the present invention, the input-to-output speed ratio and noises of the IVT system can, to a good extent, be eliminated or reduced by the time-delay control.

The present invention presents new control strategies with closed-loop controls and an integral time-delay feedback control for the IVT system to improve its control performance. Two closed-loop controllers, a crank length controller and a forward speed controller, track the speed ratio of the IVT that corresponds to the desired rotation speed of the generator and the desired rotation speed of the hydro-turbine, respectively. The time-delay feedback control reduces fluctuations of the output speed of the IVT system. With time-delay feedback control, the resulting control strategy of the IVT system can improve control performance of its speed ratio with large speed variations that is induced by the variable input speed.

For the purposes of the instant application, the invention relating to methods of use, a transmission, a transmission control system, and a computer program product according to the present invention can be implemented in any turbine-driven apparatus, for example, the VAWTs described herein. Because the IVT described herein has high efficiency for low and high fluid speeds, the IVT can be included in a power generation system such as a wind, water or hydraulic power generator, wherein the turbine in said system is selected from the group consisting of a horizontal axis fluid (wind or water) turbine, a vertical axis fluid (wind or water) turbine, and a hybrid vertical axis fluid turbine.

In a first aspect, an IVT control system is described, said IVT control system comprising:

a crank length controller comprising electronic components configured to:
determine a desired output rotation speed of an IVT; and
determine a control signal for a crank length control mechanism based on the determined output rotation speed; and a crank length control mechanism configured to receive the control signal and control the crank length of the IVT based on the control signal.

In one embodiment, the desired output rotation speed is determined based on a desired output speed and a desired input speed of the IVT. In one embodiment, the desired output rotation speed is determined based on the equation:

$$\ell_{cr}^* = \frac{\sqrt{2}\, pr_{og} w_u^*}{4 i_n w_n^*}$$

wherein $r_{og}$ is a pitch radius of an output gear of the $w_u^*$ is a desired output speed of the IVT, $i_n$ is the speed ratio of the gear pair, e.g., a noncircular gear pair, and $w_n^*$ is a desired input speed of the IVT. In one embodiment, the crank length controller is configured to: determine an estimated output rotation speed of the IVT; and determine the control signal for the crank length control mechanism based on the estimated output rotation speed. In one embodiment, the crank length controller is configured to determine the control signal based on the equation:

$$\ell_{cr} = I \Delta w_u,$$

wherein $\ell_{cr}$ is the crank length, I is an integral gain, and $\Delta w_u$ is a tracking error of the crank length controller. In one embodiment, the crank length controller is configured to change the control signal for adjusting the crank length based on an estimate of the output rotation speed of the IVT. For example, the crank length controller can be configured to use a look-up table to determine the crank length and to determine the control signal.

In a second aspect, an IVT control system is described, said IVT control system comprising:

an input-control module configured to control a motion conversion module of an IVT; and a forward speed controller comprising electronic components configured to:

determine a crank length for the IVT, a desired modulated input speed of the input-control module, and an output torque of an output shaft of the IVT; and output a control signal to the input-control module based on the determined crank length, the desired modulated input speed, and the output torque.

In one embodiment of the second aspect of the IVT control system, an electronic motor is included and configured to receive the control signal and to control modulation of an input rotation speed of the input-control module based on the control signal. In one embodiment, the forward speed controller comprises a time-delay feedback controller configured to: determine an input speed of the IVT; and adjust the control signal to the input-control module based on a tracking error of the output speed of the IVT. The IVT control system of the second aspect can further comprise at least one of:

(I) a crank length controller comprising electronic components configured to:

determine a desired output rotation speed of the IVT; and determine the crank length based on the desired output rotation speed;

(II) a torque sensor operatively connected to the output shaft of the IVT, configured to measure the output torque of the output shaft, and configured to output a signal representative of the measured output torque to the electronic components of the forward speed controller; or (III) both (I) and (II).

In a third aspect, an IVT control system is described, said IVT control system comprising a combination of the IVT control system of the first aspect and the IVT control system of the second aspect, said IVT control system thus comprising:

a crank length controller comprising electronic components configured to:

determine a desired output rotation speed of an IVT; and determine a control signal for a crank length control mechanism based on the determined output rotation speed;

a crank length control mechanism configured to receive the control signal and control the crank length of the IVT based on the control signal; and an input-control module configured to control a motion conversion module of the IVT; and a forward speed controller comprising electronic components configured to:

receive the crank length;

determine a desired modulated input speed of the input-control module and an output torque of an output shaft of the IVT; and output a control signal to the input-control module based on the determined crank length, the desired modulated input speed, and the output torque.

In a fourth aspect, a method for control of an IVT is described, the method comprising:

determining a desired output rotation speed of the IVT; and determining a control signal for a crank length control mechanism based on the determined output rotation speed; and at a crank length control mechanism:

receiving the control signal; and controlling the crank length of the IVT based on the control signal.

The method of the fourth aspect can further comprise at least one of:

(I) determining the desired output rotation speed based on a desired output speed and a desired input speed of the IVT;

(II) determining the desired output rotation speed based on the equation:

$$\ell_{cr}^* = \frac{\sqrt{2}\, pr_{og} w_u^*}{4 i_n w_n^*}$$

wherein $r_{og}$ is a pitch radius of an output gear of the IVT, $w_u^*$ is a desired output speed of the IVT, $i_n$ is the speed ratio of the gear pair, e.g., a noncircular gear pair, and $w_n^*$ is a desired input speed of the IVT;

(III) determining an estimated output rotation speed of the IVT; and determining the control signal for the crank length control mechanism based on the estimated output rotation speed;

(IV) determining the control signal based on the equation:

$$\ell_{cr} = I \Delta w_u,$$

wherein $\ell_{cr}$ is the crank length, I is an integral gain, and $\Delta w_u$ is a tracking error of the crank length controller;

(V) changing the control signal for adjusting the crank length based on an estimate of the output rotation speed of the IVT;

(VI) using a look-up table to determine the crank length and to determine the control signal; or (VII) any combination of (I)-(VI).

In a fifth aspect, a method for control of an IVT is described, the method comprising:

determining a crank length for the IVT, a desired modulated input speed of an input-control module, and an output torque of an output shaft of the IVT, wherein the input-control module is configured to control a motion conversion module of an IVT; and outputting a control signal to the input-control module based on the determined crank length, the desired modulated input speed, and the output torque.

The input-control module can includes an electronic motor configured to receive the control signal and to control modulation of an input rotation speed of the input-control module based on the control signal.

The method of the fifth aspect can further comprise at least one of:

(I) determining a desired output rotation speed of the IVT; and determining the crank length based on the desired output rotation speed;

(II) providing a torque sensor operatively connected to the output shaft of the IVT; and using the torque sensor to measure the output torque of the output shaft;

(III) determining an input speed of the IVT; and adjusting the control signal to the input-control module based on a tracking error of the output speed of the IVT; or (IV) any combination of (I)-(III).

In a sixth aspect, a computer program product comprising a computer readable storage medium having program instructions embodied thereon, the program instructions executable by a computing device to cause the computing device to control an IVT system or carry out a method of controlling an IVT by:

determining a desired output rotation speed of an IVT; and determining a control signal for a crank length control mechanism based on the determined output rotation speed; and generating an output representative of the control signal for input into the crank length control mechanism.

In one embodiment, the computer readable storage medium is non-transitory.

In a seventh aspect, a computer program product comprising a computer readable storage medium having program instructions embodied thereon, the program instructions executable by a computing device to cause the computing device to control an IVT system or carry out a method of controlling an IVT by:

determining a crank length for the IVT, a desired modulated input speed of an input-control module, and an output torque of an output shaft of the IVT, wherein the input-control module is configured to control a motion conversion module of an IVT; and outputting a control signal to the input-control module based on the determined crank length, the desired modulated input speed, and the output torque.

In one embodiment, the computer readable storage medium is non-transitory.

It should be appreciated that the IVT control systems described in the first, second and third aspects of the invention, the methods of controlling an IVT described in the fourth and fifth aspects of the invention, and the computer program products of the sixth and seventh aspects can comprise any IVT known in the art. In other words, although the instant invention will be described for use with a specific IVT, it is not limited to same.

In one embodiment, the IVT control systems described in any of the first-seventh aspects of the invention comprise an IVT comprising a pair of meshed gears, an input-control module, and a motion conversion module. In another embodiment, the IVT control systems described in any of the first-seventh aspects of the invention comprise an IVT comprising a pair of meshed gears, an input-control module, and a motion conversion module, wherein the input-control module comprises a first and a second planetary gear set positioned on a secondary shaft, an active control gear positioned on a control shaft, and an idler control gear positioned on an idler shaft, wherein speeds of the control shaft and the idler shaft are controlled by an actuator, wherein the motion conversion module comprises a first and a second scotch yoke system positioned on an input shaft, a transmitting shaft, and an output shaft, wherein a driving gear is positioned on the input shaft and wherein a driven gear is positioned on the secondary shaft, wherein a combination of an input speed from the secondary shaft and speeds of the control shaft and idler shaft constitute an output from the input-control module to the motion conversion module through the first and second planetary gear sets, respectively, wherein output speeds of the first and second planetary gear sets are input speeds of the first scotch yoke system and an output speed of the second planetary gear set is directly transmitted as an input speed to the second scotch yoke system via the transmitting shaft, wherein a combination of input speeds of the first and second scotch yoke systems are converted to translational speeds which are subsequently converted to rotational speeds of four output gears positioned on the output shaft through four rack-pinion meshings, and wherein the rotational speeds of the four output gears are rectified by one-way bearings and transmitted to the output shaft as an IVT output speed.

The individual gears in the "pair of meshed gears," or "gear pair," in the IVT can be substantially circular or noncircular. In one embodiment, the gear pair comprises two substantially circular gears. In another embodiment, the gear pair comprises two noncircular gears. Importantly, the noncircular gear pair was designed to eliminate speed variations or fluctuations of the output speed of the IVT. The input shaft is connected to a prime mover as defined herein. In one embodiment, the actuator comprises a stepper motor.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Tidal Current Energy Converters

In one aspect, a TCEC is described comprising at least one infinitely variable transmission (IVT) and at least one vertical axis water turbine (VAWT). In one embodiment, at least one IVT of the TCEC comprises a nonlinear closed-loop control combined with an integral time-delay feedback control. In one embodiment, at least one IVT of the TCEC comprises an IVT control system comprising a crank length controller. In one embodiment, at least one IVT of the TCEC comprises an IVT control system comprising a forward speed controller. In one embodiment, at least one IVT of the TCEC comprises an IVT control system comprising a crank length controller and a forward speed controller. In one embodiment, the at least one VAWT comprises a hybrid VAWT. In one embodiment, the hybrid VAWT comprises a modified-Savonius (MS) rotor in the central region and a straight bladed H-type Darrieus rotor in the surrounding annular region. In one embodiment, a common central axis of the at least one VAWT can be arranged to be vertical or horizontal, relative to any surface. In one embodiment, a common central axis of the at least one VAWT can be arranged to be vertical or horizontal, relative to the surface plane of the body of water. In one embodiment, the at least one VAWT is fully submerged in water. In one embodiment, the at least one VAWT is partially submerged in water.

In one embodiment, the TCEC comprises at least one IVT comprising an IVT control system of the first aspect, said IVT control system comprising:

a crank length controller comprising electronic components configured to:
    determine a desired output rotation speed of an IVT; and
    determine a control signal for a crank length control mechanism based on the determined output rotation speed; and
a crank length control mechanism configured to receive the control signal and control the crank length of the IVT based on the control signal.

In one embodiment, the TCEC comprises at least one IVT comprising an IVT control system of the second aspect, said IVT control system comprising:
    an input-control module configured to control a motion conversion module of an IVT; and a forward speed controller comprising electronic components configured to:
  determine a crank length for the IVT, a desired modulated input speed of the input-control module, and an output torque of an output shaft of the IVT; and
  output a control signal to the input-control module based on the determined crank length, the desired modulated input speed, and the output torque.

In one embodiment, the TCEC comprises at least one IVT comprising an IVT control system of the first and second aspect, said IVT control systems comprising:
a crank length controller comprising electronic components configured to:
  determine a desired output rotation speed of an IVT; and
  determine a control signal for a crank length control mechanism based on the determined output rotation speed;
a crank length control mechanism configured to receive the control signal and control the crank length of the IVT based on the control signal; and
an input-control module configured to control a motion conversion module of the IVT; and
a forward speed controller comprising electronic components configured to:
  receive the crank length;
  determine a desired modulated input speed of the input-control module and an output torque of an output shaft of the IVT; and
  output a control signal to the input-control module based on the determined crank length, the desired modulated input speed, and the output torque.

In one embodiment, the TCEC comprises at least one hybrid VAWT of the first aspect comprising:
(a) a first rotor system positioned in a central region and rotatable about a central axis, wherein the first rotor system comprises: a plurality of first blades, each having a concave shape that allows fluid to push on a concave side of each first blade; and a hydraulic brake system that is mounted upon the shaft with bearings; and
(b) a second rotor system positioned in an annular region surrounding the first rotor system in the central region, wherein the second rotor system comprises a plurality of second blades spaced about the central axis, wherein the cross-section of each second blade is a substantially symmetrical airfoil shape.

In one embodiment, the TCEC comprises at least one hybrid VAWT of the first aspect comprising:
(a) a first rotor system positioned in a central region and rotatable about a central axis, wherein the first rotor system comprises:
  (i) at least two blade-sets stacked vertically along the central axis, each blade-set comprising a plurality of first blades that are spaced about the central axis, wherein the at least two blade-sets are mounted upon a shaft with bearings along the central axis, wherein each first blade extends from a position proximate to the central axis out to a position distal to the central axis and has a concave shape that allows fluid to push on a concave side of each first blade, and
  (ii) a hydraulic brake system that is mounted upon the shaft with bearings; and
(b) a second rotor system positioned in an annular region surrounding the first rotor system in the central region, wherein the second rotor system comprises a plurality of second blades spaced about the central axis, wherein each of the second blades is positioned substantially parallel to the central axis and attached to at least one blade-set of the first rotor system using at least two supporting struts, wherein the cross-section of the second blade is a substantially symmetrical airfoil shape.

In one embodiment, the TCEC comprises:
(A) at least one IVT comprising an IVT control system of the first aspect, said IVT control system comprising:
a crank length controller comprising electronic components configured to:
  determine a desired output rotation speed of an IVT; and
  determine a control signal for a crank length control mechanism based on the determined output rotation speed; and
a crank length control mechanism configured to receive the control signal and control the crank length of the IVT based on the control signal; and
(B) at least one hybrid VAWT of the first aspect comprising:
(a) a first rotor system positioned in a central region and rotatable about a central axis, wherein the first rotor system comprises: a plurality of first blades, each having a concave shape that allows fluid to push on a concave side of each first blade; and a hydraulic brake system that is mounted upon the shaft with bearings; and
(b) a second rotor system positioned in an annular region surrounding the first rotor system in the central region, wherein the second rotor system comprises a plurality of second blades spaced about the central axis, wherein the cross-section of each second blade is a substantially symmetrical airfoil shape.

In one embodiment, the TCEC comprises:
(A) at least one IVT comprising an IVT control system of the second aspect, said IVT control system comprising:
an input-control module configured to control a motion conversion module of an IVT; and
a forward speed controller comprising electronic components configured to:
  determine a crank length for the IVT, a desired modulated input speed of the input-control module, and an output torque of an output shaft of the IVT; and
  output a control signal to the input-control module based on the determined crank length, the desired modulated input speed, and the output torque; and
(B) at least one hybrid VAWT of the first aspect comprising:
(a) a first rotor system positioned in a central region and rotatable about a central axis, wherein the first rotor system comprises: a plurality of first blades, each having a concave shape that allows fluid to push on a concave side of each first blade; and a hydraulic brake system that is mounted upon the shaft with bearings; and
(b) a second rotor system positioned in an annular region surrounding the first rotor system in the central region, wherein the second rotor system comprises a plurality of second blades spaced about the central axis, wherein the cross-section of each second blade is a substantially symmetrical airfoil shape.

In one embodiment, the TCEC comprises:
(A) at least one IVT comprising an IVT control system of the first aspect, said IVT control system comprising:
a crank length controller comprising electronic components configured to:
  determine a desired output rotation speed of an IVT; and
  determine a control signal for a crank length control mechanism based on the determined output rotation speed; and a crank length control mechanism configured to receive the control signal and control the crank length of the IVT based on the control signal; and (B) at least one hybrid VAWT of the first aspect comprising:

(a) a first rotor system positioned in a central region and rotatable about a central axis, wherein the first rotor system comprises:

(i) at least two blade-sets stacked vertically along the central axis, each blade-set comprising a plurality of first blades that are spaced about the central axis, wherein the at least two blade-sets are mounted upon a shaft with bearings along the central axis, wherein each first blade extends from a position proximate to the central axis out to a position distal to the central axis and has a concave shape that allows fluid to push on a concave side of each first blade, and (ii) a hydraulic brake system that is mounted upon the shaft with bearings; and (b) a second rotor system positioned in an annular region surrounding the first rotor system in the central region, wherein the second rotor system comprises a plurality of second blades spaced about the central axis, wherein each of the second blades is positioned substantially parallel to the central axis and attached to at least one blade-set of the first rotor system using at least two supporting struts, wherein the cross-section of the second blade is a substantially symmetrical airfoil shape.

In one embodiment, the TCEC comprises:

(A) at least one IVT comprising an IVT control system of the second aspect, said IVT control system comprising:

an input-control module configured to control a motion conversion module of an IVT; and a forward speed controller comprising electronic components configured to:

determine a crank length for the IVT, a desired modulated input speed of the input-control module, and an output torque of an output shaft of the IVT; and output a control signal to the input-control module based on the determined crank length, the desired modulated input speed, and the output torque; and (B) at least one hybrid VAWT of the first aspect comprising:

(a) a first rotor system positioned in a central region and rotatable about a central axis, wherein the first rotor system comprises:

(i) at least two blade-sets stacked vertically along the central axis, each blade-set comprising a plurality of first blades that are spaced about the central axis, wherein the at least two blade-sets are mounted upon a shaft with bearings along the central axis, wherein each first blade extends from a position proximate to the central axis out to a position distal to the central axis and has a concave shape that allows fluid to push on a concave side of each first blade, and (ii) a hydraulic brake system that is mounted upon the shaft with bearings; and (b) a second rotor system positioned in an annular region surrounding the first rotor system in the central region, wherein the second rotor system comprises a plurality of second blades spaced about the central axis, wherein each of the second blades is positioned substantially parallel to the central axis and attached to at least one blade-set of the first rotor system using at least two supporting struts, wherein the cross-section of the second blade is a substantially symmetrical airfoil shape.

It should be appreciated that the embodiments of the first aspect of the TCEC can further comprise a computer program product comprising a computer readable storage medium having program instructions embodied thereon, the program instructions executable by a computing device to cause the computing device to control an IVT system or carry out a method of controlling an IVT.

Figure 13:
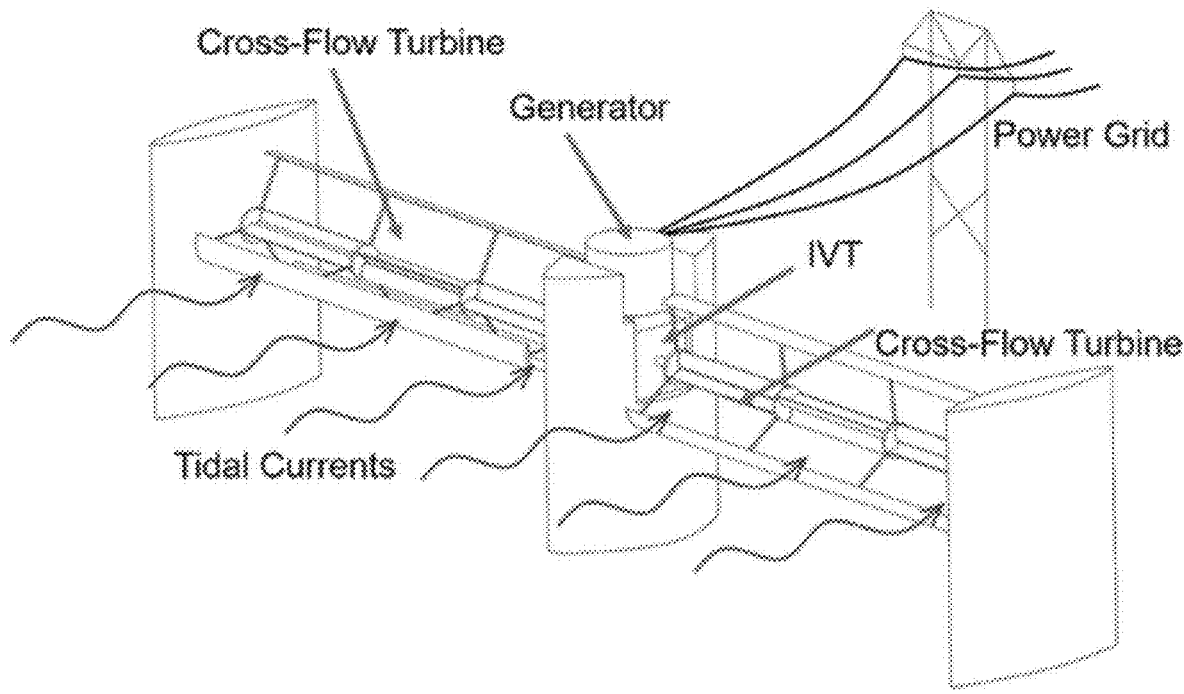
FIG. 13 is a schematic of the TCEC with two CFTs, the IVT, and the doubly-fed induction generator.

As seen in FIG. 13, the IVT can be positioned between two VAWTs, e.g., the hybrid VAWTs described herein. In one embodiment, an IVT is positioned in or on a post supporting two hybrid VAWTs. FIG. 13 is not intended to limit the scope of the TCECs, which can comprise 1, 2, 3, 4, 5, 6, 7, 8, 9, 10, or more, VAWTs with at least one IVT, wherein the ratio of VAWT/IVT in the TCEC is greater than or equal to 1. In one embodiment, a computing device comprising a computer program product comprising a computer readable storage medium having program instructions embodied thereon to cause the computing device to control an IVT system or carry out a method of controlling an IVT is positioned in or on the TCEC in proximity of the IVT. In one embodiment, a computing device comprising a computer program product comprising a computer readable storage medium having program instructions embodied thereon to cause the computing device to control an IVT system or carry out a method of controlling an IVT is remotely positioned relative to the location of the TCEC comprising at least one IVT.

It should also be appreciated that the TCEC described herein comprising at least one infinitely variable transmission (IVT) control system and at least one vertical axis wind (or water) turbine (VAWT) can comprise any IVT known in the art or any VAWT known in the art.

It should be appreciated that the method of using, and computer products of, the TCEC can correspond to the methods and computer products described herein when the TCEC comprises the specific VAWT or IVT control system, as understood by the person skilled in the art.

It should further be appreciated that the TCEC can comprise the IVT control system described herein and a horizontal axis water or wind turbine, as understood by the person skilled in the art.

EXAMPLE

Dynamic Model of the IVT System

Figure 5:
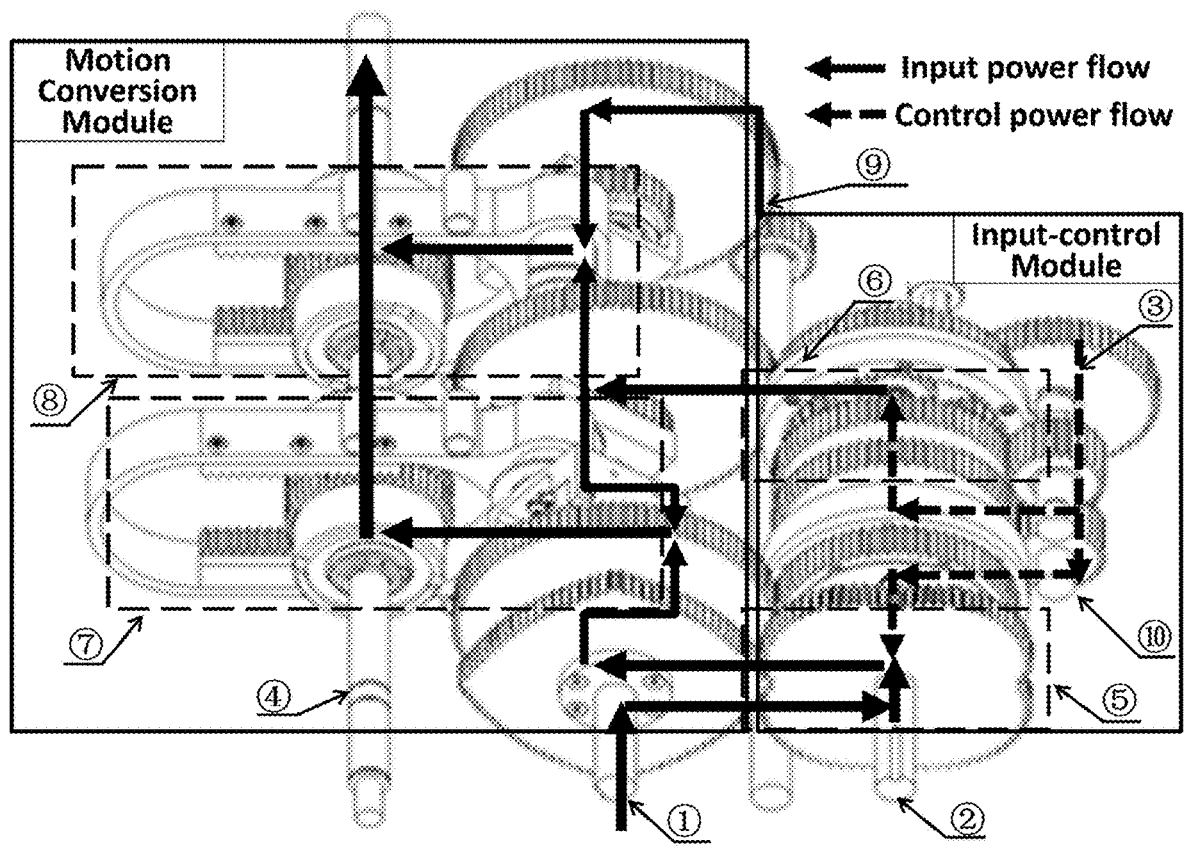
FIG. 5 is a schematic drawing of the IVT of the prior art, where (1) is the input shaft, (2) is the secondary shaft, (3) is the control shaft, (4) is the output shaft, (5) is the first 2K-H planetary gear set (PGS), (6) is the second PGS, (7) is the first scotch yoke system (SYS), (8) is the second SYS, (9) is a transmitter shaft, and (10) is an idler shaft.

A schematic drawing of the IVT that is presented in Wang and Zhu [Wang, 2016] is shown in FIG. 5. The IVT comprises a noncircular gear pair, an input-control module (ICM), and a motion-conversion module (MCM). It should be appreciated by the person skilled in the art that the gear pair can comprise two substantially circular gears. An input rotational speed is first transmitted from the noncircular gear pair to the ICM. Driving and driven noncircular gears are installed on the input shaft and secondary shaft, respectively. With the modulation effect of the noncircular gear pair, a modulated input speed is translated to the secondary shaft in the ICM. A stepper motor mounted on the control shaft in the ICM is used to provide a control speed for adjustment of the input-to-output speed ratio of the IVT. The control speed and modulated input speed are combined by two 2K-H planetary gear sets (PGSs) on the secondary shaft in the ICM. Combined speeds of ring gears of two PGSs are transmitted to SYSs in the MCM. Two SYSs transmit the combined speeds to translational speeds of yokes; four meshed rack-pinion sets then convert translational speeds of yokes to rotational speeds of four output gears. The output speed of the IVT is the maximum rotational speed of four output gears that are rectified by one-way bearings.

The IVT was designed for the conversion of variable power from the prime mover to a constant output speed with a continuously variable speed ratio. The input rotational speed and the input torque that are loaded on the input shaft are denoted as $w_p$ and $t_p$, respectively. The output rotation speed and the output torque of the output shaft of the IVT are denoted as $w_u$ and $t_u$, respectively. The input-to-output speed ratio i of the IVT is defined as $i=w_p/w_u$. The input rotational speed $w_p$ is transmitted from the DC motor to the gear pair, as shown in FIG. 5. The rotational speed $w_n$ of the driven gear (NG2) that is the modulated rotation speed of the ICM can be represented as $$w_n = \frac{w_p}{i_n} \tag{1}$$

where $i_n$ is the speed ratio of the gear pair, e.g., a noncircular gear pair. Based on the kinematic model of the IVT in [Li, 2021], the speed ratio of the IVT can be represented as $$i = \frac{w_p}{w_u} = \frac{\sqrt{2}\, pr_{og}}{4\ell_{cr}} \tag{2}$$

Since the pitch radius $r_{og}$ of the output gear is constant, the input-to-output speed ratio of the IVT is determined by the crank length $\ell_{cr}$. The crank length $\ell_{cr}$ is changed with the rotation angle $\theta_{sg}$ of control gears that can be obtained by $\theta_{sg} = \int \omega_{sg} dt$.

The IVT system includes a permanent magnetic DC motor that provides the power required to operate the IVT system, a magnetic brake that provides a variable load for the IVT system, and the IVT. There are two submodels in the dynamic model of the IVT system, i.e., a dynamic model of the magnetic DC motor and a dynamic model of the IVT. There are also some assumptions that all components of the IVT system are considered as rigid bodies and friction in the IVT system is neglected. In the experimental setup of the IVT system, the input speed $w_p$ and the input torque $t_p$ are provided by the permanent magnetic DC motor. A dynamic model of the permanent magnetic DC motor can be represented as $$\begin{cases} L_a \dot{I}_a = -R_a I_a - k_e w_p + V_p \\ J_{n1} \dot{w}_p = k_t I_a - b w_p - t_p \end{cases} \tag{3}$$

where $L_a$ is the armature inductance, $R_a$ is the armature resistance, $I_a$ is the armature current, $k_e$ is the velocity constant, $V_p$ is the supply (armature) voltage of the DC motor, $J_{n1}$ is the moment of inertia of the driving gear (NG1), e.g., a noncircular gear, $k_t$ is the torque constant, b is the damping coefficient, and the overdot means time differentiation. Substituting Eq. (1) into Eq. (3), the input torque of the IVT system can be represented as $$t_p = \frac{k_t}{R_a} V_p - \frac{k_t k_e}{R_a} i_n w_n - J_{n1} i_n \dot{w}_n - J_{n1} w_n^2 \frac{di_n}{dq_n} \tag{4}$$

where the partial derivative of $i_n$ with the respect to $q_n$ can be represented as $$\frac{di_n}{dq_n} = -\frac{p}{2\sqrt{2}} \sin\!\left(\mathrm{mod}\!\left(q_n + \frac{p}{4}, \frac{p}{2}\right) - \frac{p}{4}\right) \tag{5}$$

in which $$\mathrm{mod}\!\left(q_n + \frac{p}{4}, \frac{p}{2}\right)$$

means the remainder of the division of $$q_n + \frac{p}{4} \text{ by } \frac{p}{2}.$$

Rotational speeds $w_r$ of ring gears of PGSs are proportional to the rotational speed $w_n$ of the driven gear (NG2), e.g., a noncircular gear. The rotational speed $w_r$ of crank gears and the rotational speed of the cranks $w_{cr}$ are also proportional to the rotational speed $w_n$ of the driven gear in the ICM. The kinetic energy of the ICM can be represented as $$T_1 = \frac{1}{2} J_a w_n^2 \tag{6}$$

where $J_a$ is the effective moment of inertia of the kinetic energy with respect to $w_n$, i.e., $J_a=0.0346$ kg·m². Translational speeds of yokes of two SYSs and rotational speeds of four output gears are proportional to $\ell_{cr} w_n$. The kinetic energy of SYSs and output gears can be represented as $$T_2 = \frac{1}{2} J_b \ell_{cr}^2 w_n^2 \tag{7}$$

where $J_b$ is the effective mass of the kinetic energy with respect to $\ell_{cr} w_n$, i.e., $J_b=2.9$ kg. Rotational speeds of the output shaft and the brake are proportional to $i_n \ell_{cr} w_n$. The kinetic energy of the output shaft and the brake can be represented as $$T_3 = \frac{1}{2} J_c i_n^2 \ell_{cr}^2 w_n^2 \tag{8}$$

where $J_c$ is the effective mass of the kinetic energy with respect to $i_n \ell_{cr} w_n$, i.e., $J_c=36$ kg. The potential energy of the IVT is $$V_t = m_r g [\cos(q_n) - \sin(q_n)] \ell_{cr} \tag{9}$$

where $m_r$ is the mass of a roller, i.e., $m_r=1$ kg, and g is the gravitational acceleration. The generalized force of the IVT system can be represented as $$Q_t = i_n t_p - \frac{2\sqrt{2}}{pr_{og}} i_n t_u \tag{10}$$

The total kinetic energy of the IVT can be represented as $$T_{total} = T_1 + T_2 + T_3 - V_t \tag{11}$$

Based on Lagrange's equations, the system equation of the IVT system can be represented as $$\frac{d}{dt}\frac{\partial T_{total}}{\partial w_n} - \frac{\partial T_{total}}{\partial q_n} = Q_t \quad (12)$$

With Eqs. (4), (10), and (12), a dynamic equation of the IVT system can be represented as $$J(q_n, \ell_{cr})\ddot{q}_n = \quad (13)$$
$$G(q_n)\ell_{cr} - \frac{1}{2}J_q(q_n)\dot{q}_n^2 - V_k(q_n)\dot{q}_n + F_p(q_n, V_p) - F_u(q_n, t_u)\ell_{cr}$$

where $J(q_n, \ell_{cr})$ is the sum of moments of inertia of components in the IVT system that can be represented as $$J(q_n, \ell_{cr}) = J_a + J_b i_n^2 + J_c i_n^2 \ell_{cr}^2 + J_{n1} \ell_{cr}^2 \quad (14)$$

G ($q_n$) is the gravitational acceleration function of the potential energy of the IVT system that can be represented as $$G(q_n) = g[\sin(q_n) + \cos(q_n)] \quad (15)$$

$J_q(q_n)$ is the derivative of the sum of moments of inertia of the IVT system with respect to $\dot{q}_n$, which can be represented as $$J_q(q_n) = 2(J_c \ell_{cr}^2 + J_{n1})i_n \frac{di_n}{dq_n} \quad (16)$$

$V_k(q_n)$ is the kinetic energy of the IVT system with respect to $\dot{q}_n$ that can be represented as $$V_k(q_n) = \frac{k_t k_e}{R_a} i_n^2 \quad (17)$$

$F_p(q_n, V_p)$ is the kinetic energy generated by the DC motor, which can be represented as $$F_p(q_n, V_p) = \frac{k_t}{R_a} i_n V_p \quad (18)$$

and $F_u(q_n, t_u)$ is the kinetic energy generated by the brake, which can be represented as $$F_u(q_n, t_u) = \frac{2\sqrt{2}}{pr_{og}} i_n t_u \quad (19)$$

Based on Eq. (22), the input-to-output speed ratio i of the IVT is determined by the rotational angle $q_{sg1}$ of the first control gear which is equal to the rotational angle $q_s$ of the control shaft. The rotational angle $q_s$ of the control shaft is controlled by the stepper motor that can be represented as $$q_s = q_{sg1} = \frac{pV_s}{n_{spr}L_s I_s} \quad (20)$$

where $V_s$, $L_s$, and $I_s$ are the applied voltage, the armature inductance, and the armature current of the stepper motor, respectively, and $n_{spr}$ is the number of steps per revolution. Based on Eqs. (2) and (20), the crank length $\ell_{cr}$ can be also represented as $$\ell_{cr} = \frac{pV_s}{2n_{spr}L_s I_s} \quad (21)$$

Nonlinear Model-Based IVT Controllers

Figure 6:
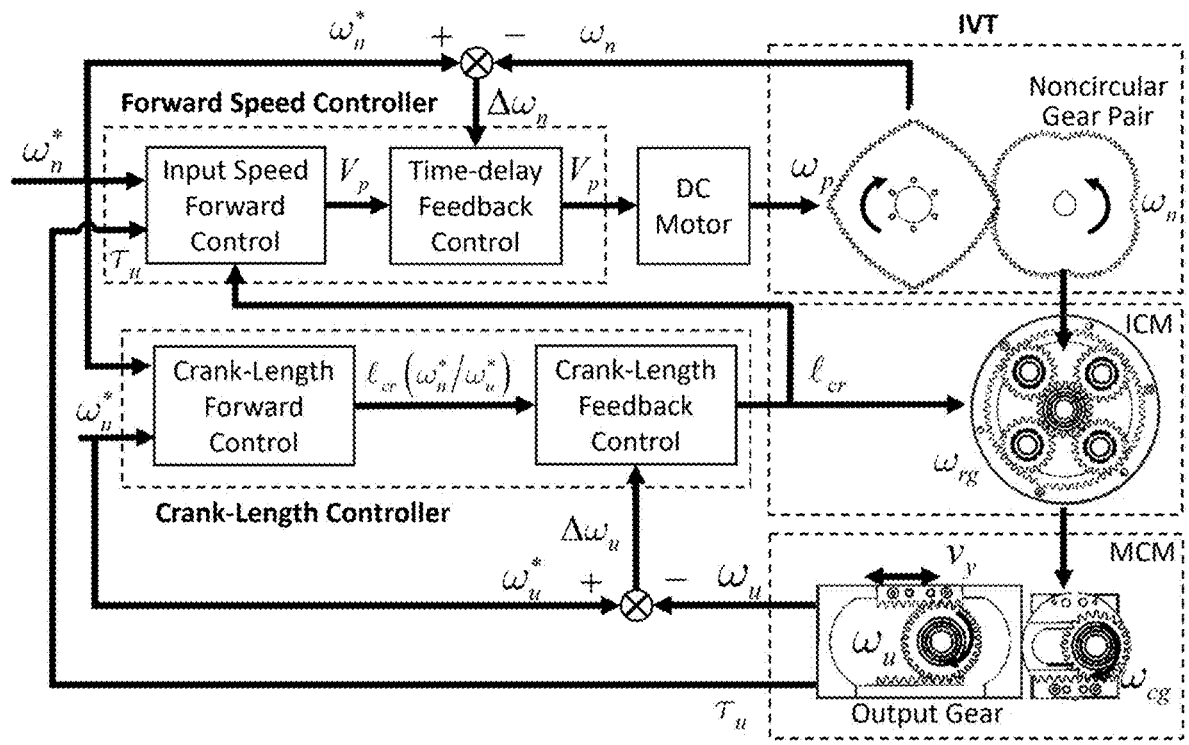
FIG. 6 is a schematic of the control structure for the IVT system.

FIG. 6 shows the block diagram of the control scheme of the IVT system. The control problem addressed herein is the feedback design for two IVT controllers, which are a crank length controller and a forward speed controller. The input-to-output speed ratio i of the IVT system is controlled by the forward speed controller and the crank length controller. The crank length controller is designed to adjust the speed ratio for any desired output speed of the IVT. The forwards speed controller is used to track a desired input speed for maximizing efficiency of the prime mover with time-delay feedback control that can reduce speed fluctuations of the output speed. Since the dynamic performance of the IVT system strongly depends on the rotational angle $q_n$ of the gear, e.g., a noncircular gear, and the crank length $\ell_{cr}$ according to Eq. (13), the control behavior and the input-to-output speed ratio change with the rotational speed $w_p$ of the DC motor and the rotational angle $q_s$ of the stepper motor. Hence, the goal of the control strategy of the IVT system is to make the average of the output speed $w_n$ of the IVT over 2 p in $q_n$ converge to a desired output speed for any $V_p$ and $t_u$ that are input and output loads, respectively, by adjusting the crank length $\ell_{cr}$, while the DC motor operates on the rotational speed of the prime mover (e.g., automobile, hydro-turbine, etc.). Detailed control objectives include: the crank length controller generates a desired crank length $\ell^*_{cr}$ that depends on the speed ratio of the desired input speed $w_n^*$ and the output speed $w_u^*$ required in the IVT system; and the forward speed controller forces the modulated input speed $w_n$ of the ICM to approach the desired input speed $w_n^*$. Additionally, the time-delay feedback controller can reduce speed fluctuations of the output speed.

i. Crank Length Controller

The crank length controller involves a crank length forward control and a crank length feedback control. Based on Eq. (2), the crank length forward control is designed to calculate the desired crank length that can be represented as $$\ell^*_{cr} = \frac{\sqrt{2} \, pr_{og} w_u^*}{4 i_n w_n^*} \quad (22)$$

Figure 7:
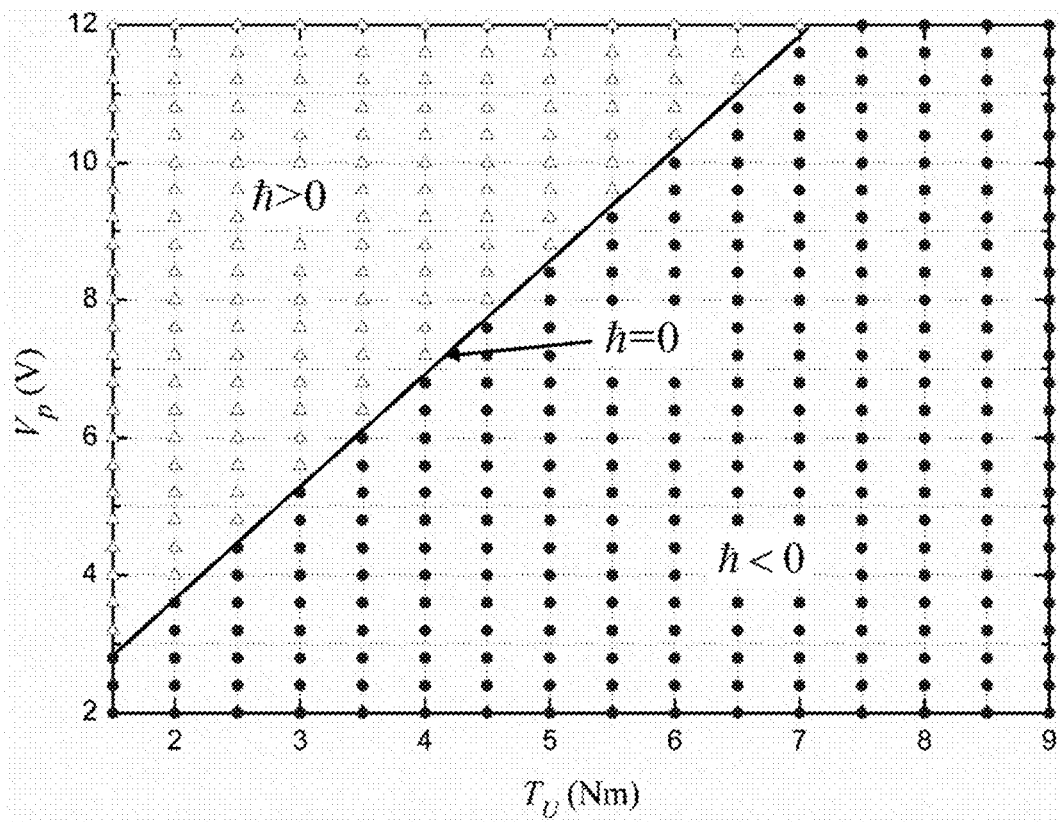
FIG. 7 illustrates the boundary $\hbar = 0$ to distinguish different cases for the crank length controller; $\hbar > 0$ on the upper left side of the boundary and $\hbar < 0$ for the case in the other side of the boundary.

A look-up table is developed for the shift schedule of the crank length controller based on the maximal crank length $\ell_{cr}^{max}$. If the calculated crank length is smaller than or equal to the maximal crank length $\ell_{cr}^{max}$, the crank length $\ell_{cr}$ is a function of the desired modulated input speed $w_n^*$ and the desired output speed $w_u^*$, which is denoted as $\Re(w_u^*; w_n^*)$; if the calculated crank length is larger than the maximal crank length $\ell_{cr}^{max}$, the crank length $\ell_{cr}$ is set to the maximal crank length $\ell_{cr}^{max}$. In order to distinguish different cases in the look-up table based on the armature voltage $V_p$ of the DC motor and the output torque $t_u$ of the output shaft, a boundary function of the crank length controller in working regions of the armature voltage $V_p$ of the DC motor and the output torque $t_u$ of the output shaft can be defined by $$\hbar = \mathfrak{R}(w_u^*; w_n^*) - \ell_{cr\,max} \tag{23}$$

which is shown in FIG. 7. Hence the look-up table of the crank length controller of the IVT system can be represented as $$\ell_{cr}(w_u^*; w_n^*) = \begin{cases} \mathcal{R}(w_u^*; w_n^*), & \text{if } \hbar \leq 0 \\ \ell_{crmax}, & \text{if } \hbar > 0 \end{cases} \tag{24}$$

The crank length feedback control is designed to adjust the crank length of the IVT for the desired output speed. Since one has no access to the mean output speed $w_n$ of the IVT in real time, the average of the output speed of the IVT in a period of 2 p prior to the current rotation position is used as a feedback variable. The tracking error of the crank length controller can be represented as $$\Delta w_u = w_u^* - \frac{2p}{\int_{q_n(t)-2p}^{q_n(t)} \frac{1}{w_u} ds} \tag{25}$$

The crank length controller can be represented as $$\ell_{cr} = l \Delta w_u \tag{26}$$

where l is the integral gain that is used to control the changing rate of the crank length, which can be determined in control experiments. In order to achieve control of the output speed $w_u$ of the IVT, the average of the tracking error $\Delta w_u$ in a period of 2 p needs to asymptotically approach zero. The crank length $\ell_{cr}$ that is generated by the crank length controller is used in the forward speed controller.

ii. Forward Speed Controller

An input speed forward control was designed to obtain the corresponding armature voltage $V_p$ of the DC motor to the desired modulated input speed $w_n^*$. The modulated input speed $w_u$ of the ICM is a periodic variable and the rotation angle $q_n$ of the driven gear, e.g., a noncircular gear, can be represented as $q_n(t) = \int_0^t w_n(t) ds$. Since the modulated input speed $w_n$ of the ICM is always positive, the dynamic equation of the IVT system can be represented as (27)

$$J(q_n, \ell_{cr}) w_n w_n' = M - \frac{1}{2} J_q(q_n) w_n^2 - V_k(q_n) w_n \tag{27}$$

where a prime denotes the derivative of a function with respect to $q_n$, $w_n \dot{w}_n$ is equal to $\dot{w}$, $J_q(q_n)$ is the derivative of the sum of moments of inertia of the IVT system with respect to $q_n$, $V_k(q_n)$ is the kinetic energy of the IVT system, and $$M = G(q_n) \ell_{cr} + F_p(q_n, V_p) - F_u(q_n, t_u) \ell_{cr} \tag{28}$$

where $G(q_n)$ is the gravitational acceleration function of the potential energy of the IVT system, $F_p(q_n, V_p)$ is the kinetic energy generated by the DC motor, and $F_v(q_n, t_u)$ is the kinetic energy generated by the brake. A coordinate transform is defined as $$t(q_n) = \int_0^{q_n} \frac{1}{w_n} ds$$

based on the bijective map between $q_n$ and $\ell_{cr}$. The right-hand side of Eq. (27) is continuous with respect to $w_n$, and existence of a periodic solution of Eq. (27) and its convergence have been proven [Wang, 2018]. As mentioned above, the control goal is to operate the rotation speed of the DC motor to force the modulated input speed $w_n^*$ with $q_n = w_n^* t + \Delta q_n$, wherein $\Delta q_n$ is a periodic variable with the zero mean. To quantify the control goal of the forward speed controller, the tracking error of the forward speed controller is defined as $$\Delta w_n = w_n^* - \overline{w}_n \tag{29}$$

where $\overline{w}_n$ is the average of the modulated input speed $w_n$ of NG2 in a period of 2 p prior to the current rotation position. The time-delay variable can be represented as [Wang, 2018]

$$\overline{w}_n = \frac{2p}{\int_{q_n(t)-2p}^{q_n(t)} \frac{1}{w_n} ds} \tag{30}$$

In order to achieve control of the modulated input speed $\Delta w_n$ of the ICM, the average of the tracking error $\Delta w_n$ in a period of 2 p needs to asymptotically approach zero as the rotation angle $q_n$ of the driven gear increases; hence, Eq. (29) should approach zero. According to Eqs. (14), (16), and (28), J, $J_q$, and M are functions of $q_n$, $\ell_{cr}$, $V_p$, and $t_u$. The crank length $\ell_{cr}$ is generated by the crank length controller. The output torque $t_u$ of the output shaft can be measured by the torque meter, but cannot be controlled. The armature voltage $V_p$ of the DC motor can serve as the control variable of the forward speed controller. The time-delay feedback control of the IVT system can be represented as $$\begin{cases} Jw_n' = \frac{M}{w_n} - \frac{1}{2} J_q(q_n) w_n - V_k(q_n) \\ V_p' = I_1 \Delta w_n + I_2(w_n - w_T) \end{cases} \tag{31}$$

where I is the integral gain, $I_2$ is the damping gain, and $w_T = w_n(q_n - 2p)$. The goal of the time-delay feedback control is to select $I_1$ and $I_2$ for fast convergence of Eq. (31) to the desired armature voltage $V_p$ of the DC motor and the output torque $t_u$ of the output shaft in their working regions that are $V_p \in [2, 12]$ V and $t_u \in [1.5, 9]$ Nm, respectively.

IVT Experimental Setup

Figure 8:
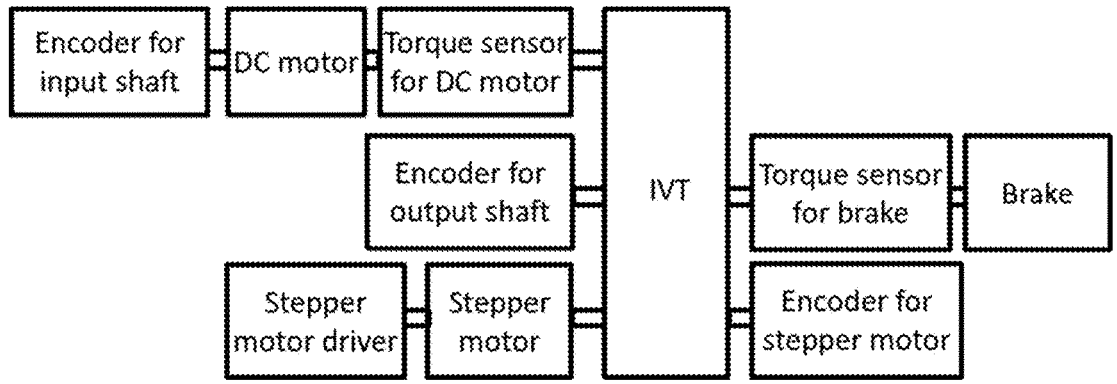
FIG. 8 is a photograph of an experimental setup of the IVT system.

The IVT system as it is during control tests is shown in FIG. 8. This experimental setup of the IVT system consists of an IVT, a permanent DC motor, a magnetic brake, a stepper motor, two torque sensors, and three angular encoders. The control speed of control gears is provided by a stepper motor. The magnetic brake mounted on the output shaft is used to provide a constant torque for loading the gear system meshes while the DC motor provides the power required to operate the IVT system at any desired input rotational speed value. Three angular encoders are mounted on the input shaft, the secondary shaft, and the output shaft of the IVT to measure the corresponding rotational angles, respectively. Meshed gears, scotch yoke systems, and bearings of the IVT are lubricated by Gear Oil VG100 during control tests to provide favorable lubrication conditions to minimize friction and damping. All shafts of the IVT are supported by oversized bearings and a rigid housing to ensure that translational motions and torsional vibration of gear trains are small. The DC motor and the magnetic brake are both mounted on rigid pedestals and connected to the corresponding shafts by couplings to eliminate the eccentric effect.

Figure 9:
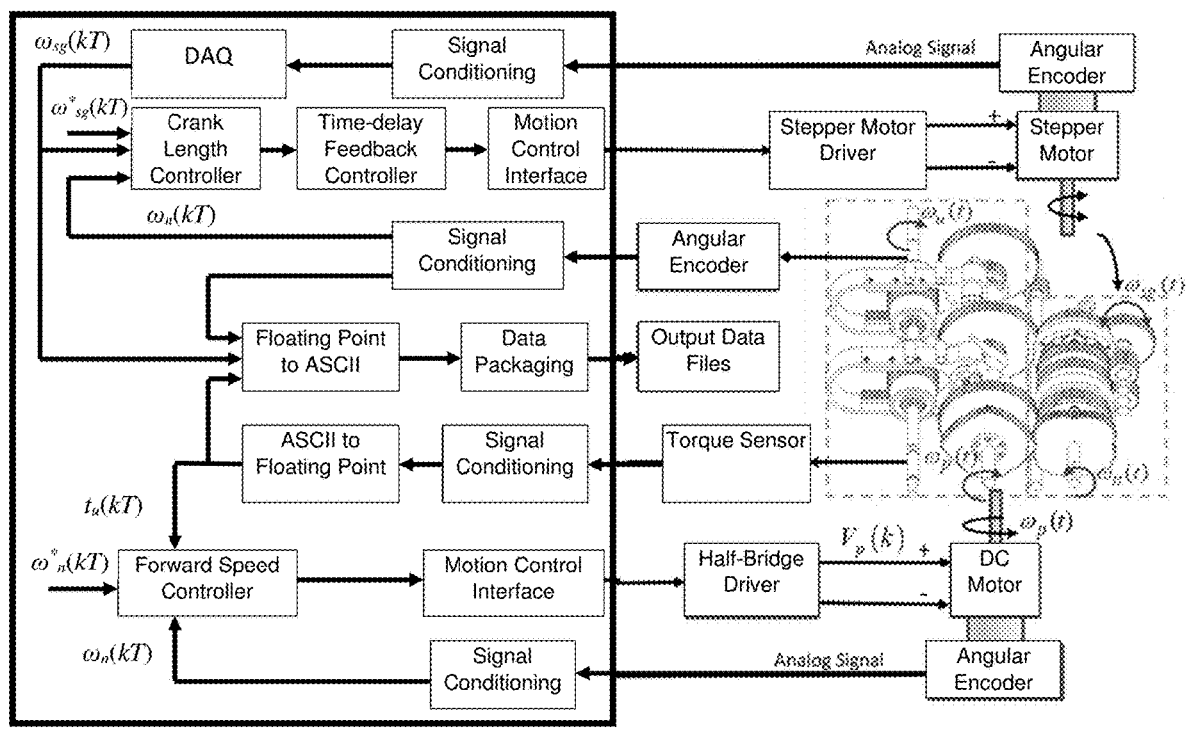
FIG. 9 is a schematic of the block diagram of the proposed control strategy for the IVT system.

The complete implementation of the proposed control strategy for the IVT system was performed using LABVIEW. National Instruments devices are used to build the controllers for the IVT system. A data acquisition (DAQ) unit was used to sample signals from three angular encoders that were installed on the input shaft, the secondary shaft, and the output shaft of the IVT, and transfers these signals to a computer. A schematic diagram is shown to explain in detail the overall operation of the control system for the IVT system, as shown in FIG. 9. According to the input data of three-day tidal speed data, an acceleration control test is performed based on averaging every four data points of tidal speeds to reduce the test time from 72 to 18 h. The proposed control strategy for controlling the modulated input speed $w_n$ of the input-control module and the crank length $\ell_{cr}$ of the IVT system were implemented in the IVT system according to the following procedure:

Step 1: The implementation used the same control strategy for the forward speed controller and the crank length controller described in "Crank length Controller." The desired output speed for control tests was set to 300 rpm.

Step 2: The input speed $w_p(t)$ of the input shaft of the IVT was determined by the desired modulated input speed $w_n'(kT)$ of the ICM, and was converted to the voltage percentage of the DC motor.

Step 3: The proposed control strategy of the IVT system was discretized with a sampling time of T=5 ms. The time interval for each control loop was set to 0.1 s.

Step 4: With signals from the angular encoder on the input shaft, the forward speed controller built in the computer generates control signals for the modulated input speed $w_n(t)$ of the ICM, and the control signals were transferred to the DC motor by the time-delay feedback controller. The gains $I_1$ and $I_2$ in the time-delay feedback control are set as 0.015 and 0.021 mm/rad$^{-1}$, respectively.

Step 5: The DAQ generated a signal sequence with signals of the output speed $w_n(kT)$ from the angular encoder on the output shaft, and outputs it to the crank length controller. The expected input-to-output speed ratio was changed to the next value by changing the crank length $\ell_{cr}$, which is controlled by the rotation angle of the control shaft based on Eq. (2). The integral gain I in the crank-length controller is set as 0.0145 mm/rad$^{-1}$. The rotation angle of the control shaft was driven by the stepper motor to reach the expected rotation angle. The stepper motor was controlled by the crank length controller through the motion control interface to finish the current control loop.

System Identification

To develop the control model that is applicable to a desired speed ratio of the IVT system, system parameters and continuous time signals of the DC motor and the IVT are identified and used to describe nominal behaviors of the IVT system. The pursued approach to obtain these system parameters of an approximation model of the true IVT system is to perform experiments on the closed-loop system in FIG. 6. The DC motor of the IVT system is considered as one unit here. The manipulated variable is the armature voltage $V_p(t)$ of the DC motor. Measured signals of the DC motor are the armature voltage $\hat{V}_p$, the armature current $\hat{I}_a$, the input torque $\hat{t}_p$, and the angular velocity $\hat{w}_p$. System parameters of the DC motor are shown in Table. 1. It is understood by the person skilled in the art that these system parameters represent one embodiment of a DC motor and are not intended to limit the invention in any way.

TABLE 1

System Parameters of the DC Motor

| Item | Value |
|---|---|
| Armature inductance $L_a$ (mH) | 1.476 |
| Armature resistance $R_a$ ($\Omega$) | 0.487 |
| Torque constant $k_t$ (Nm/A) | 0.0479 |
| Damping coefficient $\beta$ | 0.43 |
| Moment of Inertia of NG1 $J_{n1}$ (kg · m$^2$) | 0.0214 |
| Velocity constant $k_e$ (V/rad/s) | 0.048 |

System parameters of the IVT that are the nonlinear part of the IVT system can be estimated based on the system parameters of the DC motor. Output signals of the output torque $\hat{t}_p$ of the IVT can be transformed to frequency domain via discrete Fourier transform (DFT) for a standard DFT grid $\Omega_p$ that is $$\Omega_p=\{0.05;0.10;0.20;0.30;0.40;0.50;0.60;0.70;0.80, \ldots \\ \ldots,1.0;2.0;3.0;4.0;5.0;6.0;7.0;8.0;9.0;10.0, \ldots \\ ,14.0;18.0;22.0;26.0;30.0;34.0;38.0;42.0;46.0\} \quad (32)$$

Based on Eqs. (27) and (28), the discretizing continuous-time model of the IVT system with k=t/t$_0$. To avoid excessive amplitudes of input signals of the armature voltage $\hat{V}_p$ of the DC motor, the phases $\varphi_i$ of input signals of the armature voltage $\hat{V}_p$ of the DC motor are chosen based on Schroeder phases [Isermann, 2011]. Estimated frequency response functions of the output rotation speed and the output torque of the IVT system are $$\hat{w}_u = -13.712 + \frac{1.880 \times 10^7}{90.551\sqrt{\frac{p}{2}}} e^{-2\left(\frac{w_i+189.033}{90.551}\right)} \quad (33)$$

$$\hat{t}_u = -23.661 + \frac{8.998 \times 10^6}{104.761\sqrt{\frac{p}{2}}} e^{-2\left(\frac{w_i+203.450}{104.761}\right)} \quad (34)$$

respectively, where $w_i \in \Omega_p$, and the subscript i denotes the ith frequency. Based on the least squares method, one has $$\Gamma = \sum_{i=1}^{29} |w_u(k) - \hat{w}_u(w_i)|^2 + \sum_{i=1}^{29} |t_u(k) - \hat{t}_u(w_i)|^2 \quad (35)$$

Figure 10A:
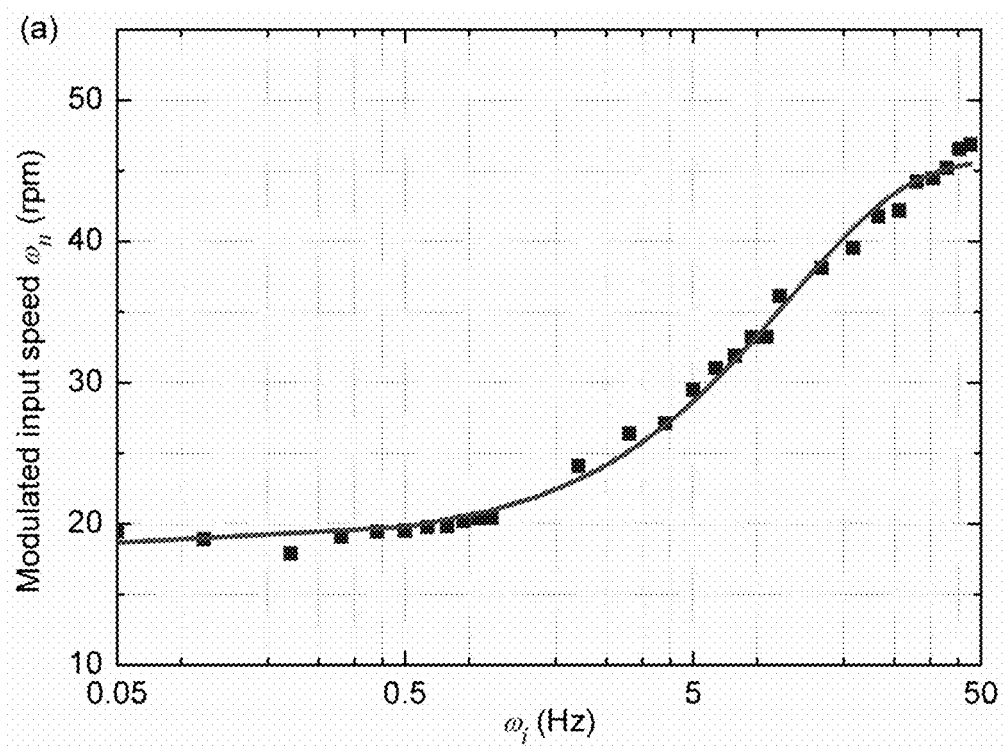
FIG. 10A illustrates the frequency responses (dots) for $w_i \in \Omega_p$ and estimated frequency response function (solid line) of the modulated input speed.
Figure 10B:
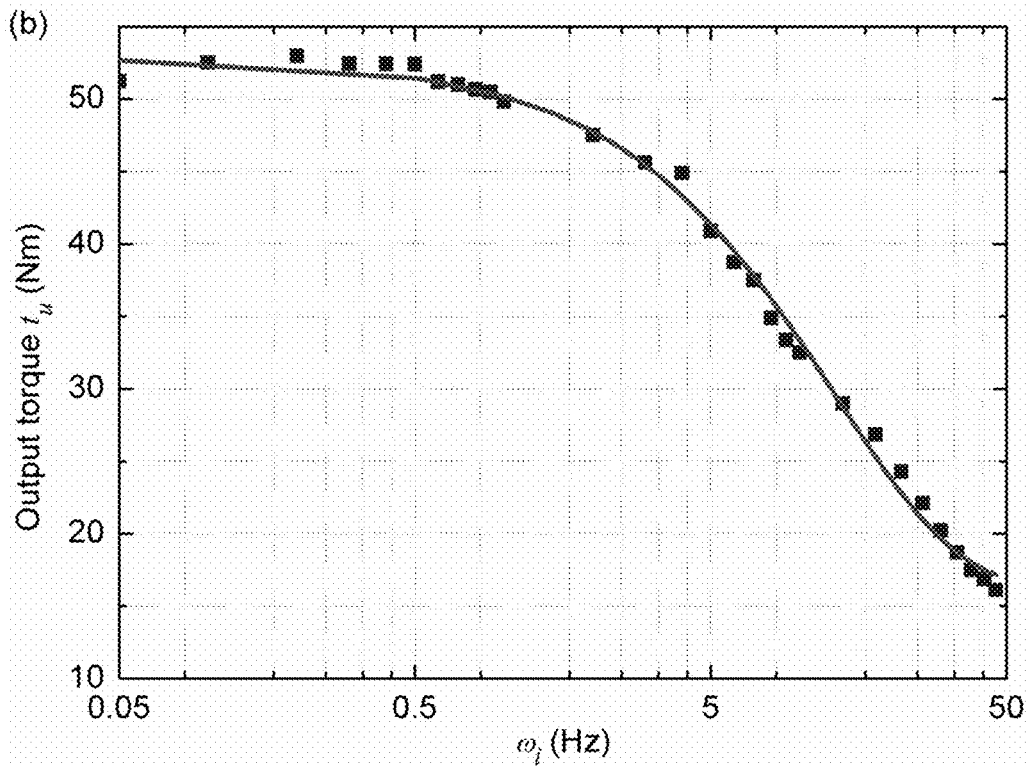
FIG. 10B illustrates the frequency responses (dots) for $w_i \in \Omega_p$ and estimated frequency response function (solid line) of the output torque of the IVT system.

System parameters $J_a$, $J_b$, and $J_c$ of the IVT can be obtained by minimizing Eq. (35), as shown in Table 2. Results of frequency response functions of the IVT system are based on multiple harmonics of the fundamental frequency of the IVT system, as shown in FIGS. 10A and 10B.

TABLE 2

System parameters of the IVT

| Parameter | Value |
|---|---|
| Effective moment of inertia of the kinetic energy $J_a$ (kg m$^{2}$) | 0.0346 |
| Effective mass of the kinetic energy $J_b$ (kg) | 2.9 |
| Effective mass of the kinetic energy $J_c$ (kg) | 36 |

Tidal Resource and Hydro-Turbine Assessment

Figure 11:
FIG. 11 illustrates the tide measurement location at Chesapeake Bay (36° 57.531' N, 76° 00.924' W).
Figure 12:
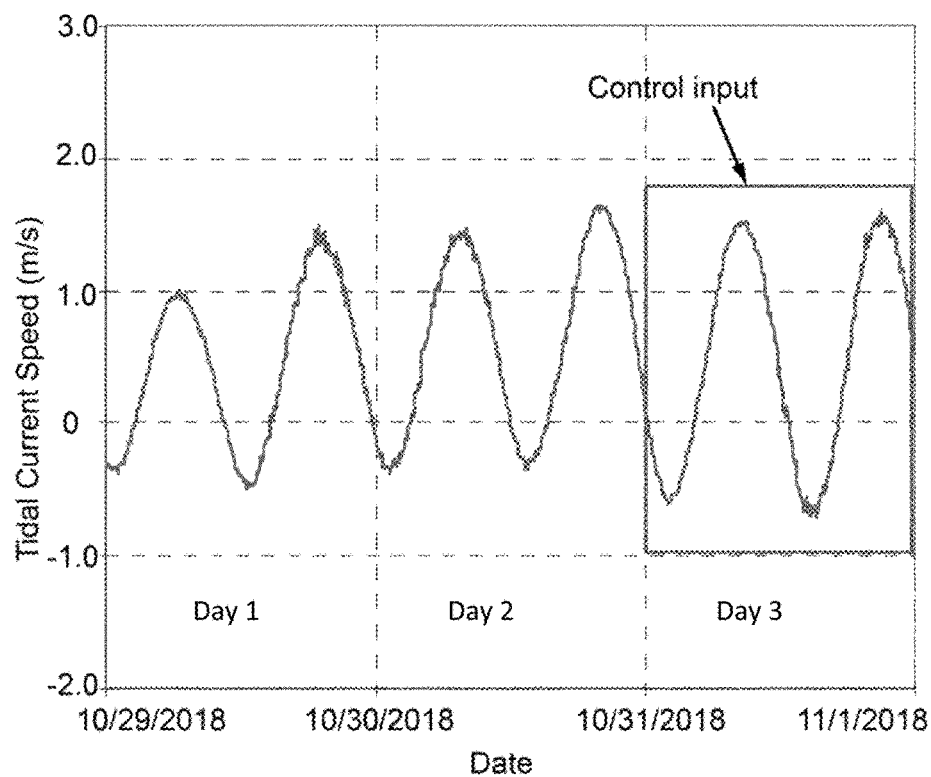
FIG. 12 illustrates the three-day tidal current speed data at the tide measurement location shown in FIG. 12.

Chesapeake Bay, which is the largest bay in the US, is approximately 315 km long and 4.2 to 56 km wide and has a surface area of nearly 11,601 km$^2$ [Xiong, 2010]. In this experiment, tidal current speed measurement was deployed at the 20 m depth of water at the mouth of Chesapeake Bay, just east of the Bay Bridge tunnel, as shown in FIG. 11. Three-day tidal current speed data of the deployed location in Chesapeake Bay was retrieved from the National Oceanic and AtmosphericAdministration [Earwaker, 1999], as shown in FIG. 12. These three days in FIG. 12 are denoted as Day 1, Day 2, and Day 3 herein. The positive value of the tidal current speed means tidal flows from Chesapeake Bay to Atlantic Ocean, whilethe negative value means the tidal flows are in the opposite direction. Magnitudes of the positive and negative directions of tidal speed ranges are approximately 1.62 m/s and 0.71 m/s, respectively. The IVT was used in a TCEC which comprised two cross-flow turbines (CFTs), an IVT, and a doubly-fed induction generator, as shown in FIG. 13. The CFT used in this example is a hybrid vertical axis wind (or water) turbine apparatus comprising a modified-Savonius (MS) rotor in the central region and a straight bladed H-type Darrieus rotor in the surrounding annular region, as described herein in aspects x-x. Each CFT is 2 m in diameter and 5 m long, with a 20 m mean depth. The TCEC can generate 35 kW at a tidal current speed of 1.5 m/s. In order to maintain high harvesting efficiency of CFTs at both low and high tidal current-speeds, the TSR of CFTs are kept at its optimal value, which for the purposes of this experiment was 2 [Liu, 2019].

i. Experimental Control Results for Rotation Speeds of the CFT

Figure 14A:
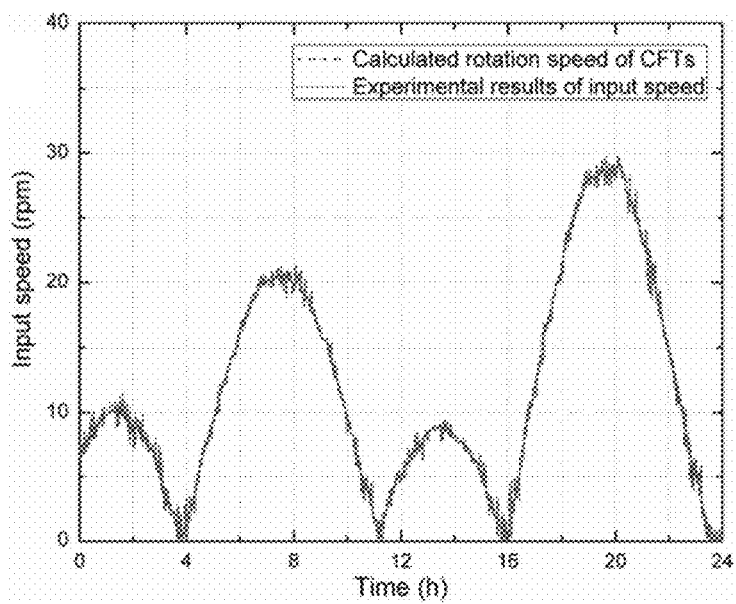
FIG. 14A illustrates the variable input speed profiles of the IVT system with three-day tidal speed data for Day 1.
Figure 14B:
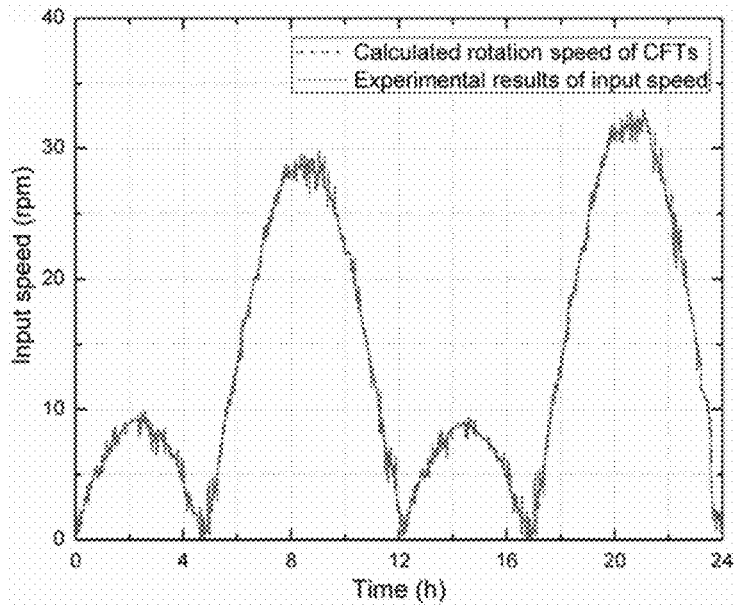
FIG. 14B illustrates the variable input speed profiles of the IVT system with three-day tidal speed data for Day 2.
Figure 14C:
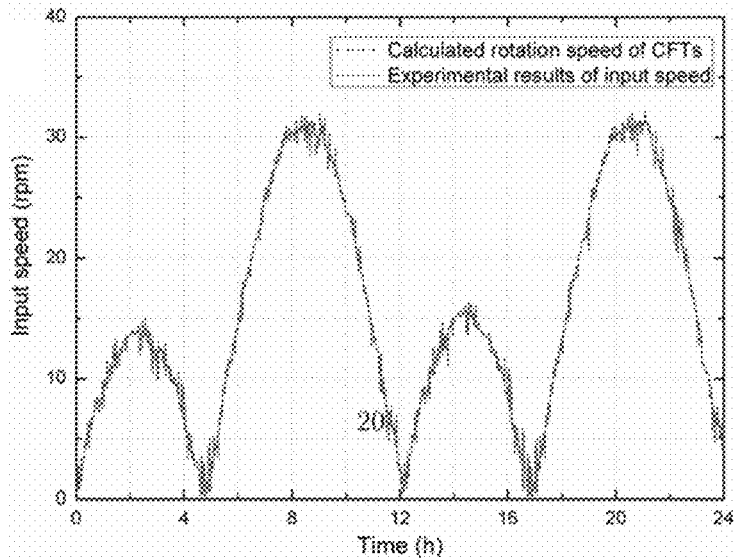
FIG. 14C illustrates the variable input speed profiles of the IVT system with three-day tidal speed data for Day 3.
Figure 15A:
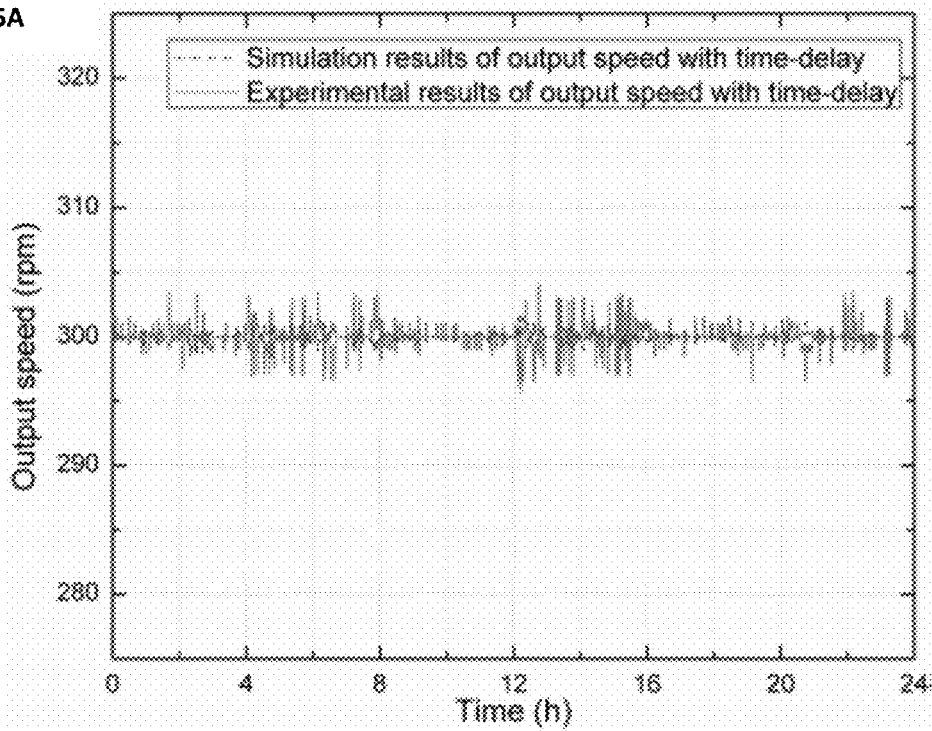
FIG. 15A illustrates the experimental and simulation results of output speeds $w_u$ of tidal speeds in Day 1 with time-delay feedback control.
Figure 15B:
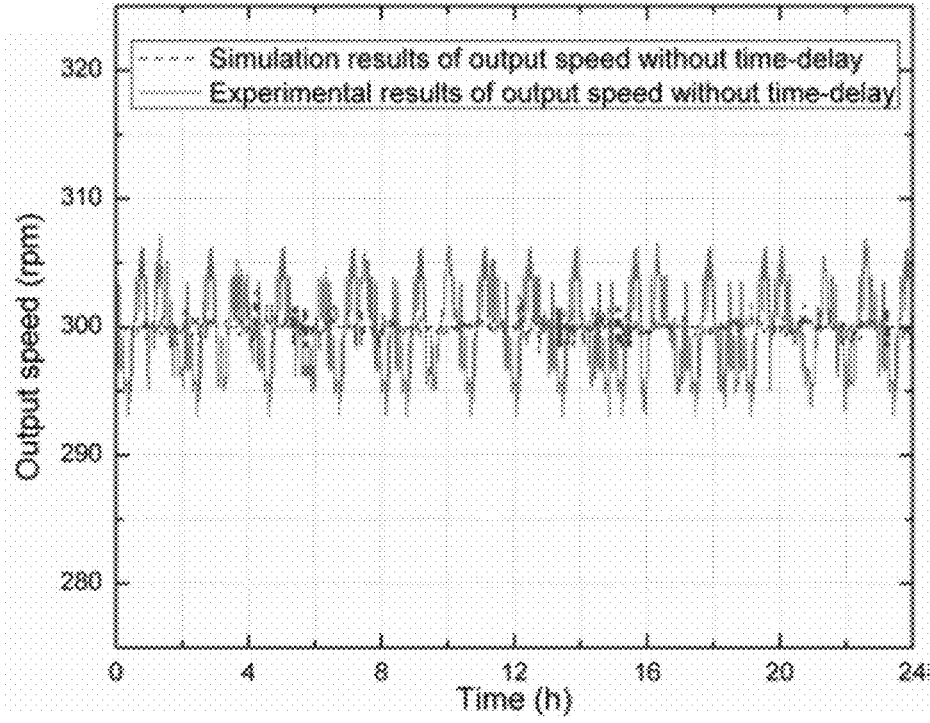
FIG. 15B illustrates the experimental and simulation results of output speeds $w_u$ of tidal speeds in Day 1 without time-delay feedback control.
Figure 16A:
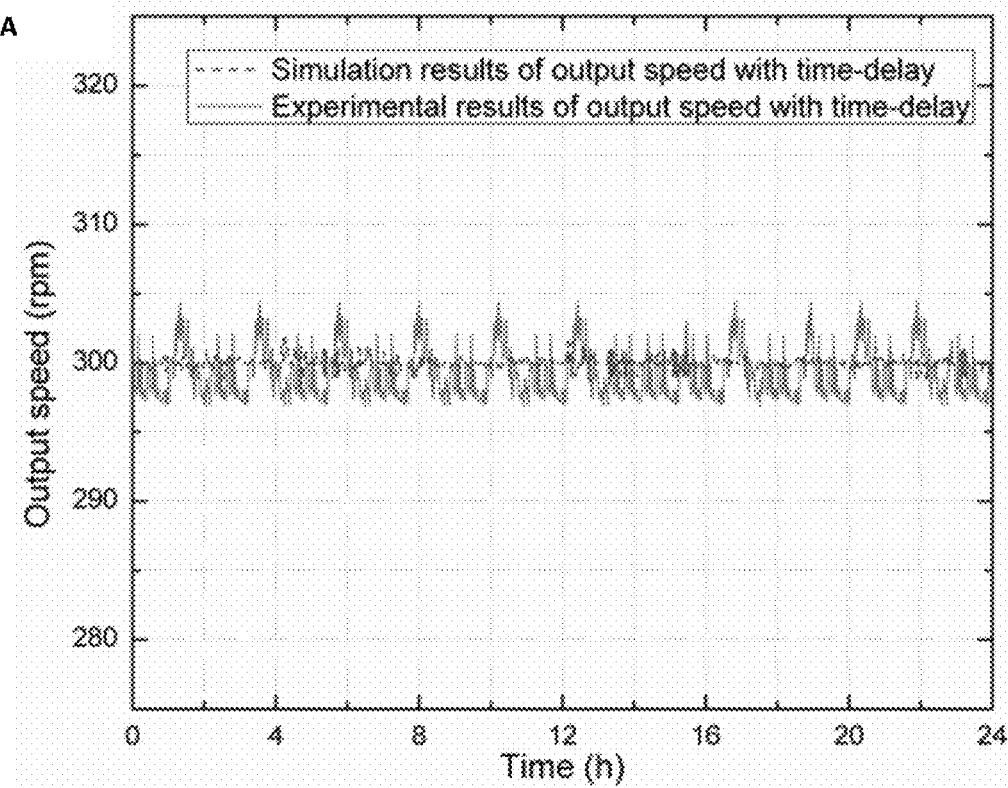
FIG. 16A illustrates the experimental and simulation results of output speeds $w_u$ of tidal speeds in Day 2 with time-delay feedback control.
Figure 16B:
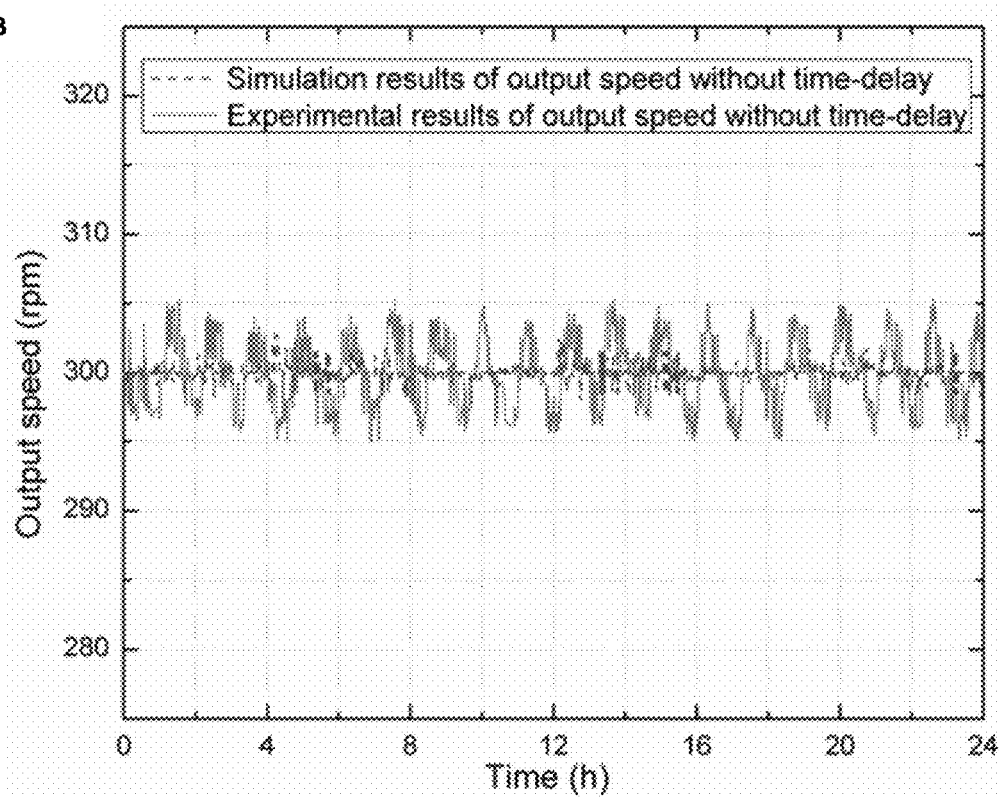
FIG. 16B illustrates the experimental and simulation results of output speeds $w_u$ of tidal speeds in Day 2 without time-delay feedback control.
Figure 17A:
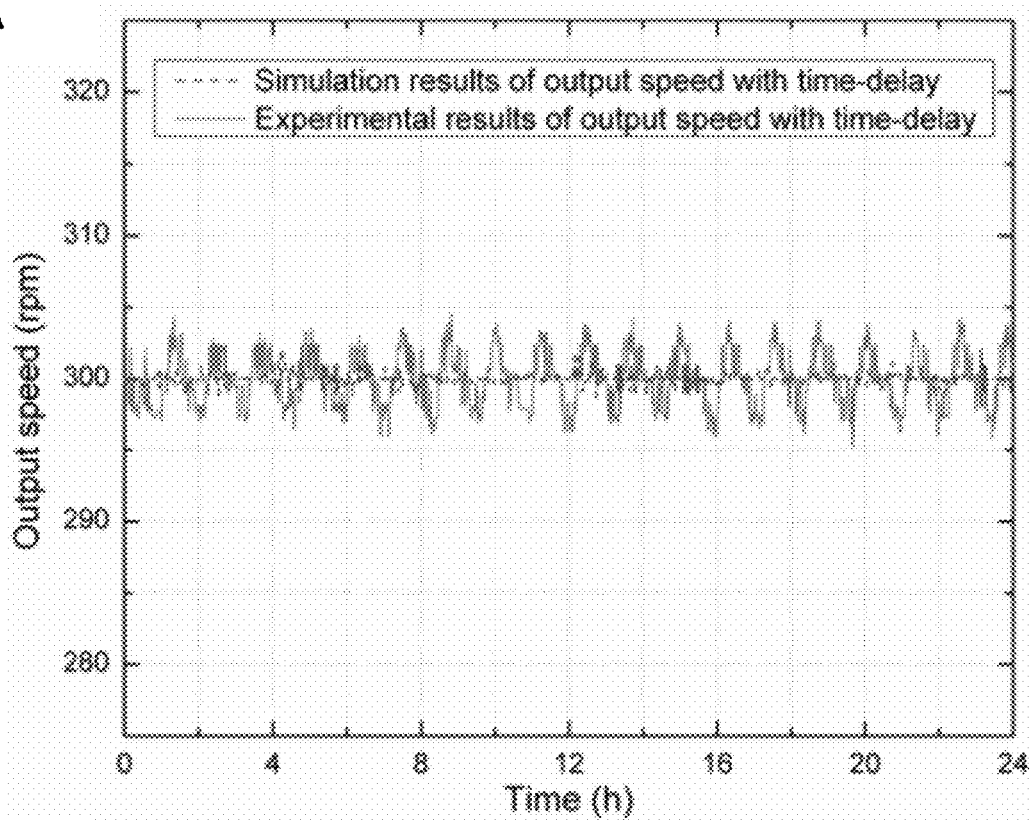
FIG. 17A illustrates the experimental and simulation results of output speeds $w_u$ of tidal speeds in Day 3 with time-delay feedback control.
Figure 17B:
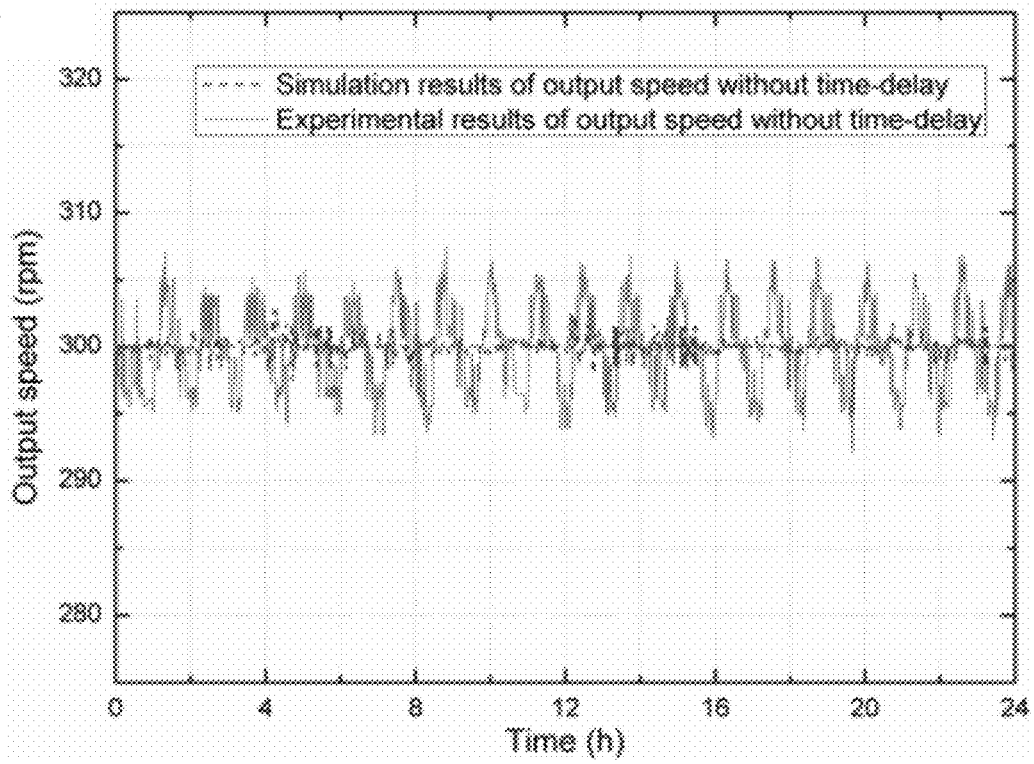
FIG. 17B illustrates the experimental and simulation results of output speeds $w_u$ of tidal speeds in Day 3 without time-delay feedback control.
Figure 18A:
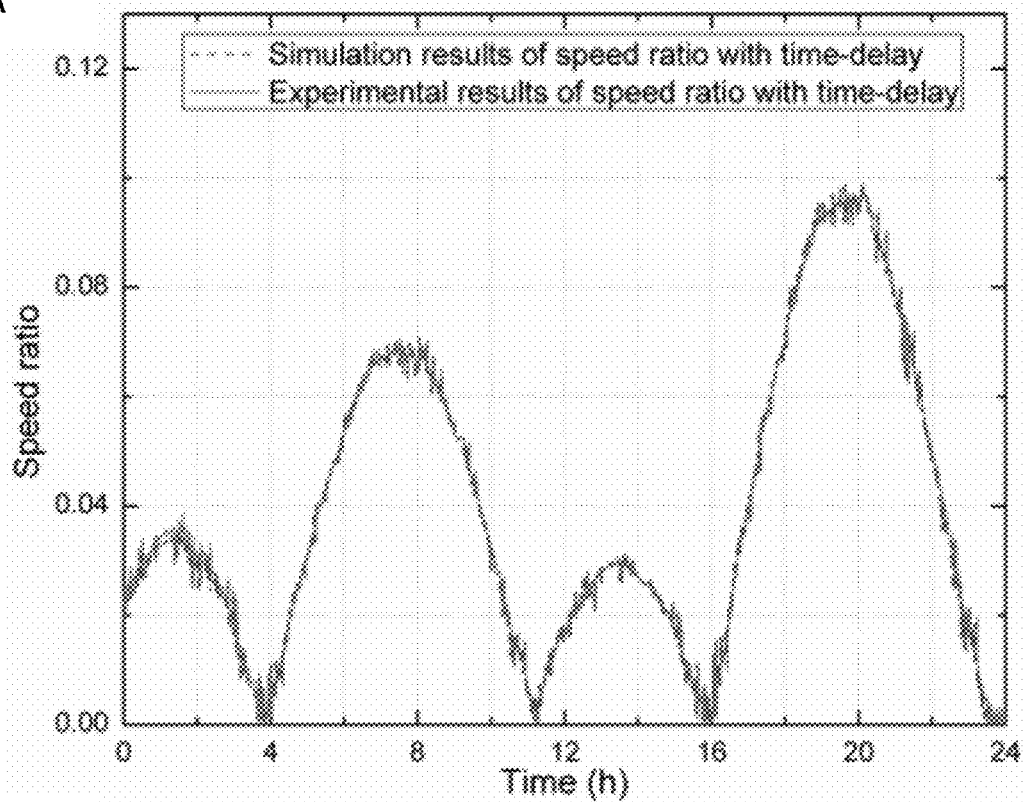
FIG. 18A illustrates the experimental and simulation results of speed ratios of tidal speeds in Day 1 with time-delay feedback control.
Figure 18B:
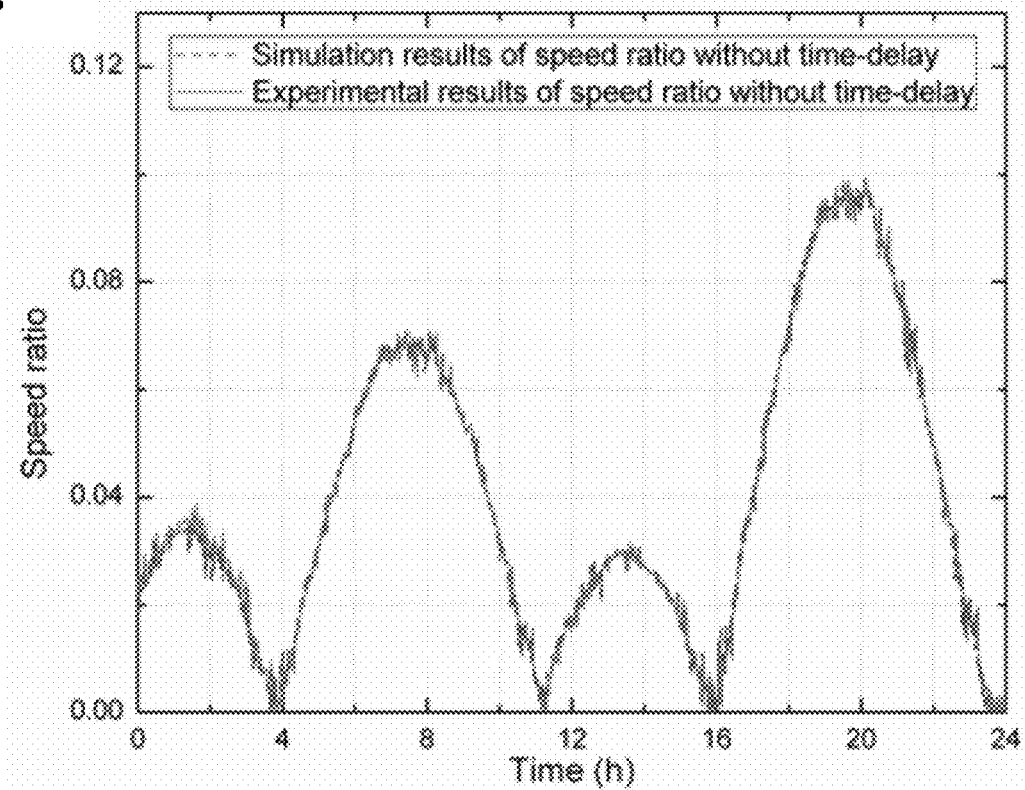
FIG. 18B illustrates the experimental and simulation results of speed ratios of tidal speeds in Day 1 without time-delay feedback control.
Figure 19A:
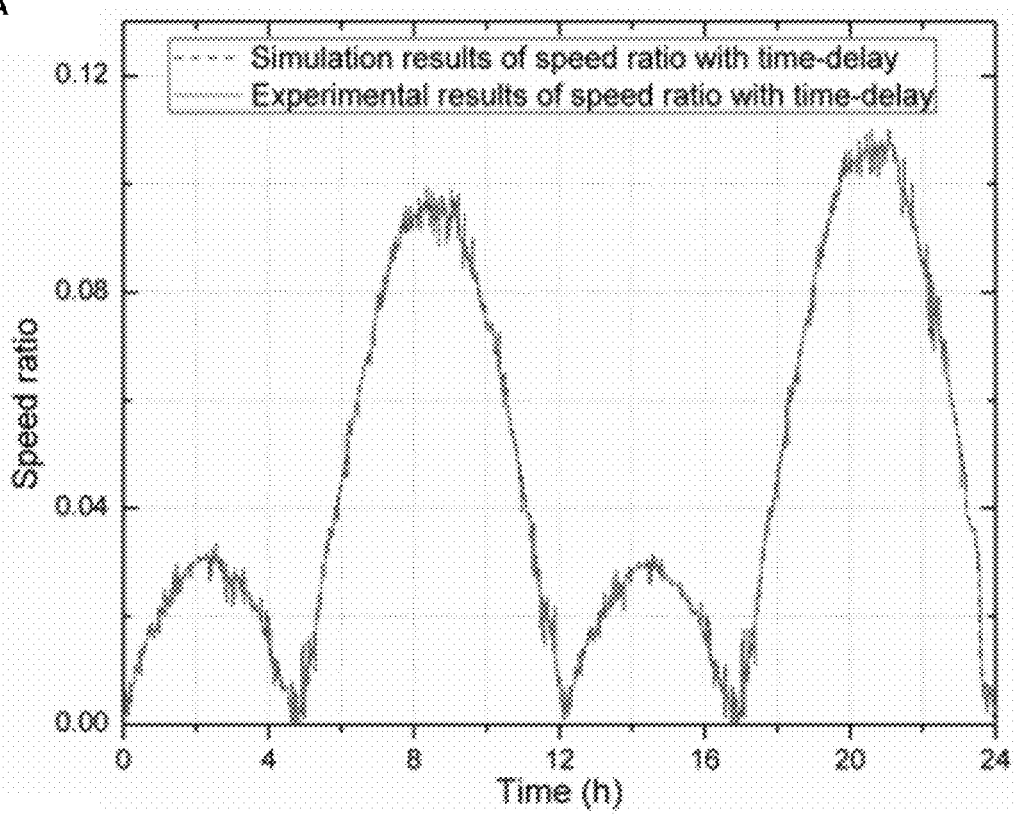
FIG. 19A illustrates the experimental and simulation results of speed ratios of tidal speeds in Day 2 with time-delay feedback control.
Figure 19B:
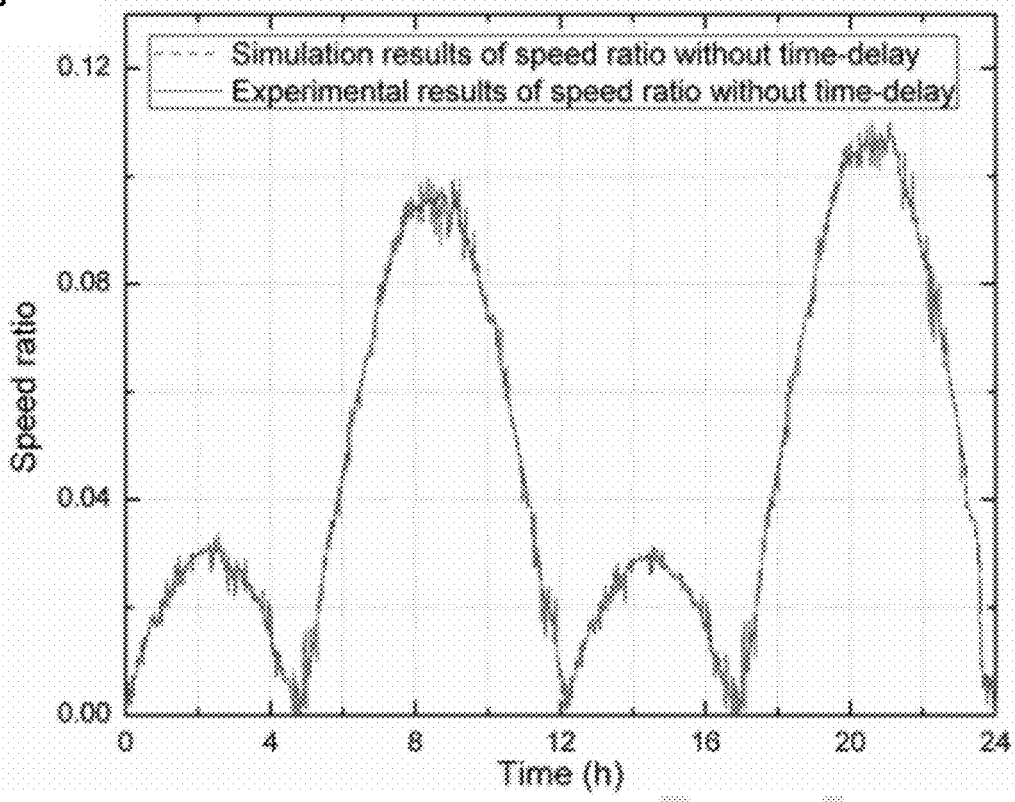
FIG. 19B illustrates the experimental and simulation results of speed ratios of tidal speeds in Day 2 without time-delay feedback control.

Control tests on the performance of the proposed control strategy of the IVTsystem were conducted on the test rig in FIG. 8. The maximal crank length $\ell_{cr}$ was set to 12. Control tests for variable tidal speeds were performed to validate the control strategy with variable speed ratios. The input speed of the input shaft of the IVT and the calculated rotation speed of CFTs were obtained based on their TSR and the tidal current speed. The average output speed $\overline{w}_u$ was sampled over a duration of each rotation of the output shaft to obtain its average value. Experimental average speed ratios can be obtained by dividing the input speeds $w_p$ by the average output speeds $\overline{w}_u$. The control performance of the proposed control strategy of the IVT system was evaluated in a control test using the variable calculated rotation speed of CFTs. The control test for a variable input speed was performed to validate the control strategy by keeping the output speed constant, which is 300 rpm, with the variable rotation angle $\theta_s$ of the control shaft. The variable input speed profiles of three-day tidal speed data that was applied in the control test is shown in FIGS. 14A-14C. FIGS. 14A-14C also exhibits the tracking performance of the forward speed controller for the variable rotation speed of CFTs. Maximum errors between experimental results of input speeds and the calculated rotation speed of CFTs corresponding to tidal speed data of Day 1, Day 2, and Day 3 are 2.36%, 2.17%, and 2.04%, respectively.

ii. Experimental Control Results for Variable Tidal Speeds

The evolution in time of the output speed $w_u$ of the IVT with the variable calculated rotation speed of CFTs with three-day tidal speed data are shown in FIGS. 15A-B, FIGS. 16A-B, and FIGS. 17A-B for Day 1, Day 2, and Day 3, respectively. The IVT reaches the stable desired output speed $w_u^*$ in around 0.8 s via the proposed control strategy. For the time exceeding 0.8 s, the proposed crank length controller keeps the speed ratio constant, which means that the crank length $\ell_{cr}$ is a constant and the stepper motor does not operate during this period. In the time period from 0 to 0.8 s, the crank length controller changes the crank length to its expected value and changes the rotation angle of the stepper motor to achieve the desired control angle. Maximum errors between the average output speed $\overline{w}_u$ of the IVT and the desired output speed were within 1.43%, 1.58%, and 1.61%, respectively, which can arise from backlashes in gears and gaps in components in the IVT, lubrication and misalignment issues, and friction between gear tooth surfaces.

Despite input speed variation, the proposed control strategy substantially ensures an almost constant output speed $w_n$ of the IVT system with variable tidal speeds. The average error between the experimental result of the output speeds without time-delay feed-back control and the desired output speed corresponding to tidal speed data of Day 1, Day 2, and Day 3 were 4.97%, 4.43%, and 5.04%, respectively. The proposed time-delay feedback control can effectively reduce fluctuations of the output speed of the IVT system with variable tidal speeds. In order to further verify the accuracy of experimental results, simulation results of the proposed control strategy of the IVT system are also provided here. The average error between the simulation results of the output speeds with time-delay feedback control and the desired output speed corresponding to tidal speed data of Day 1, Day 2, and Day 3 were 0.59%, 0.54%, and 0.64%, respectively. The deviation between average errors of experimental and simulation results of the output speed with time-delay feedback control corresponding to tidal speed data of Day 1, Day 2, and Day 3 were 1.74%, 1.62%, and 1.82%, respectively. The average error between the simulation result of the output speed without time-delay feedback control and the desired output speed corresponding to tidal speed data of Day 1, Day 2, and Day 3 were 4.21%, 4.16%, and 4.63%, respectively. The deviation between average errors of experimental and simulation results of the output speed without time-delay feedback control corresponding to tidal speed data were 4.14%, 3.68%, and 3.87%, respectively. The high control performance of the output speed of the IVT system was validated, wherein small deviations between the corresponding average errors of experimental and simulation results of the output speed with and without time-delay feedback control were achieved.

Figure 20A:
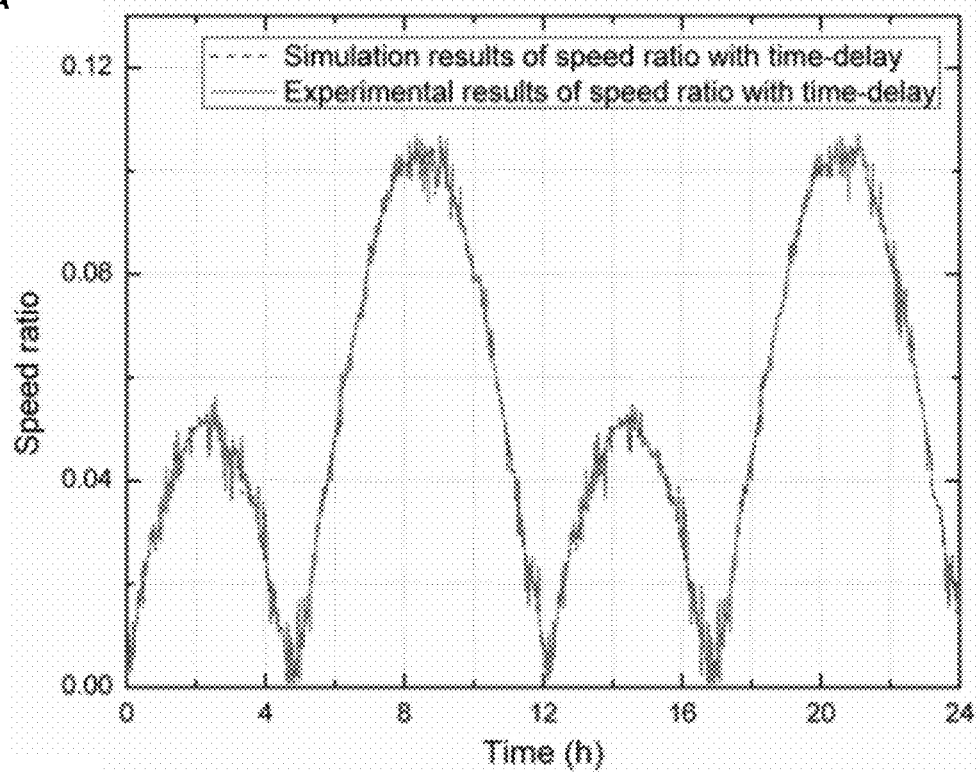
FIG. 20A illustrates the experimental and simulation results of speed ratios of tidal speeds in Day 3 with time-delay feedback control.
Figure 20B:
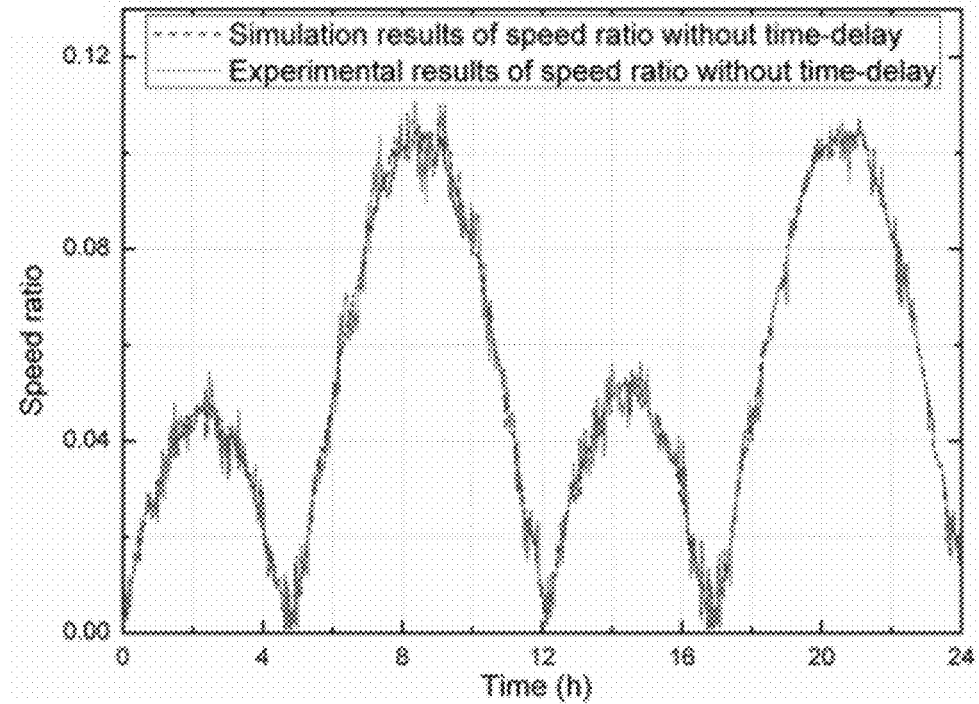
FIG. 20B illustrates the experimental and simulation results of speed ratios of tidal speeds in Day 3 without time-delay feedback control.

Since the input speed jumps from one sinusoidal waveform to another, sudden changes of the speed ratio occur at each peak of the waveform and the speed ratio is adjusted back to the desired value in one or two control loops with the proposed control strategy of the IVT system. Experimental and simulation results of the speed ratios of the IVT corresponding to tidal speed data of Day 1, Day 2, and Day 3 are shown in FIGS. 18A-b, FIGS. 19A-B, and FIGS. 20A-20B, respectively. The speed ratios were kept to their desired value with the variable input speeds of the IVT system. The deviation between average errors of experimental and simulation results of the speed ratios with time-delay feedback control corresponding to tidal speed data of Day 1, Day 2, and Day 3 were 2.24%, 2.19%, and 2.41%, respectively, as shown in FIGS. 20A-20B. The deviation between average errors of experimental and simulation results of the speed ratio without time-delay feedback control corresponding to tidal speed data of Day 1, Day 2, and Day 3 were 4.67%, 4.31%, and 4.43%, respectively. Fluctuations of the speed ratios on these three days can be reduced by 2.39%, 2.12%, and 2.02% with the proposed time-delay feedback control. Comparison of the speed ratios of experimental and simulation results with time-delay feedback control shows that the proposed control strategy of the IVT system can achieve good control accuracy of the IVT system with the variable rotation speeds of CFTs.

iii. Spectral Analysis of Experimental Control Results

Figure 21:
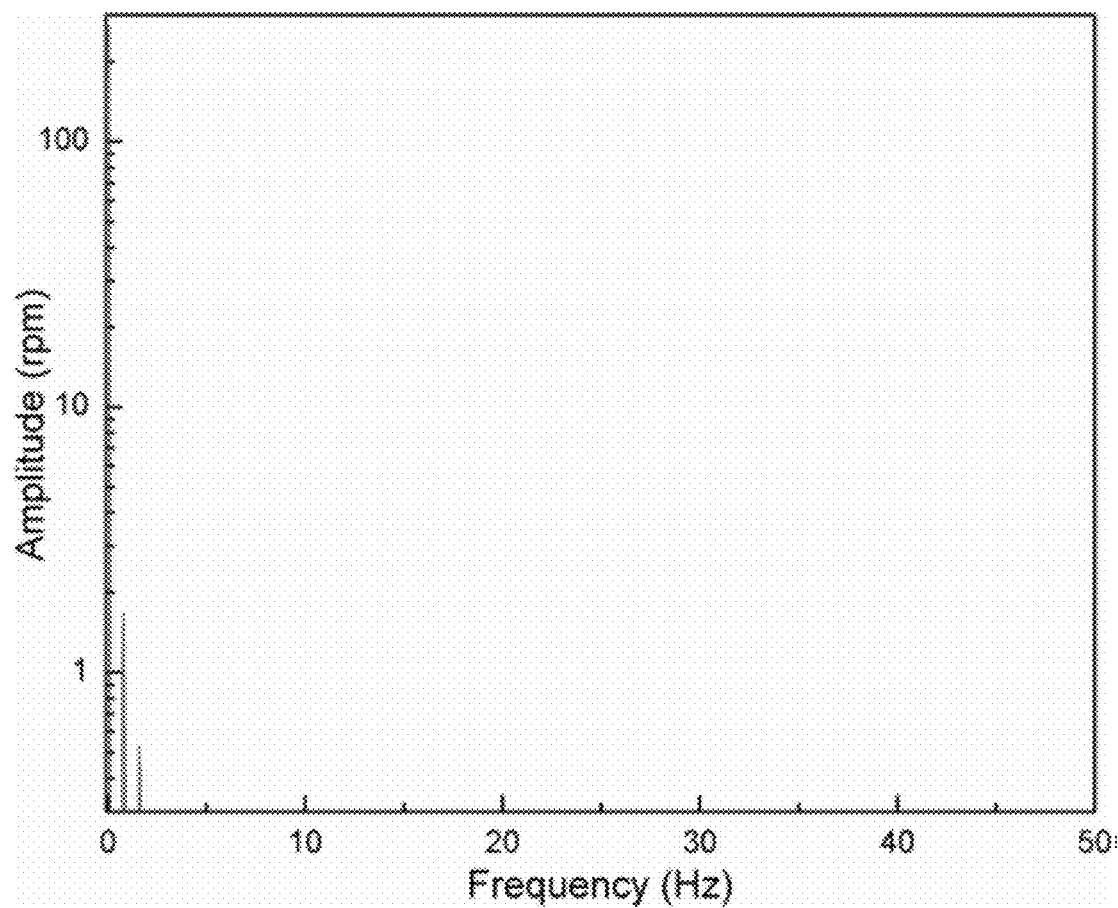
FIG. 21 illustrates the frequency analysis result of the experimental output speed of the IVT with time-delay feedback control.

In order to analyze high-frequency components in experimental results of output speeds of the IVT, fast Fourier transform analysis of experimental results of the output speed of the IVT is performed here, as shown in FIG. 21. According to the frequency analysis result, there is no high-frequency oscillations in output speed signals. Three components of the frequency analysis result are frequencies of rack-pinion sets in scotch-yoke systems, the noncircular gear pair, and planetary gear sets of the IVT, which are 0.04 Hz, 0.79 Hz, and 1.58 Hz, respectively, which are in good agreement with their theoretical results, which are 0.0416 Hz, 0.8148 Hz, and 1.6131 Hz, respectively.

Conclusions

A new control strategy that combines a closed-loop control and an integral time-delay feedback control was developed for high-performance nonlinear control of the IVT system. The forward speed controller and the crank length controller were developed based on the nonlinear dynamic model of the IVT system, whose equations are derived using Lagrange's equations. The primary merit of the forward speed controller and the crank length controller lies in the fact that an accurate and complete model-based approach can establish a tracking error model for desired control values in varying operating conditions of TCECs. The proposed control strategy with the tracking error model exhibits good control performance of the speed ratio of the IVT system with a variable input speed. The time-delay feedback control can reduce fluctuations of the output speed and the speed ratio of the IVT. Experimental results show that the control strategy can adjust and stabilize the speed ratio of the IVT system for the desired output speed. The control strategy of the IVT system can restrict fluctuations of the output speed and the speed ratio within 1.61% and 2.41% for the variable rotation speed of CFTs, respectively. The proposed control strategy can be used to promote commercialization of the IVT for TCECs.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

REFERENCES

J. Baker, Features to aid or enable self starting of fixed pitch low solidity vertical axis wind turbines, J. Wind Eng. Ind. Aerod., 15 (1) (1983), pp. 369-380

Y. Bazilevs, A. Korobenko, X. Deng, J. Yan, M Kinzel, J.O. Dabiri, Fluid-structure interaction modeling of vertical-Axis wind turbines, J. Appl. Mech., 81 (8) (2014), 081006-081006-8

A.-J. Buchner, M. Lohry, L. Martinelli, J. Soria, A. J. Smits, Dynamic stall in vertical axis wind turbines: comparing experiments and computations, J. Wind Eng. Ind. Aerod., 146 (2015), pp. 163-171

M. Chowdhury, K. S. Rahman, V. Selvanathan, N. Nuthammachot, M. Suklueng, A. Mostafaeipour, A. Habib, M. Akhtaruzzaman, N. Amin, K. Techato, Current trends and prospects of tidal energy technology, Environment, Development and Sustainability (2020) 1-16.

L. A. Danao, O. Eboibi, R. Howell, An experimental investigation into the influence of unsteady wind on the performance of a vertical axis wind turbine, Appl. Energy, 107 (2013), pp. 403-411

L. A. Danao, J. Edwards, O. Eboibi, R. Howell, A numerical investigation into the influence of unsteady wind on the performance and aerodynamics of a vertical axis wind turbine, Appl. Energy, 116 (2014), pp. 111-124

E. Denny, The economics of tidal energy, Energy Policy 37 (5) (2009) 1914-1924.

R. Dominy, P. Lunt, A. Bickerdyke, J. Dominy, Self-starting capability of a Darrieus turbine, Proc. IME J. Power Energy, 221 (1) (2007)

K. L. Earwaker, C. E. Zervas, Assessment of the National Ocean Service's Tidal Current Program, National Oceanic and Atmospheric Administration, 1999.

O. Edenhofer, R. Pichs-Madruga, Y. Sokona, K. Seyboth, S. Kadner, T. Zwickel, P. Eickemeier, G. Hansen, S. Schlömer, C. von Stechow, et al., Renewable Energy Sources and Climate Change Mitigation: Special Report of the Intergovernmental Panel on Climate Change, Cambridge University Press, 2011.

R. Everett, G. Boyle, S. Peake, J. Ramage, Energy Systems and Sustain-ability: Power for a Sustainable Future, Oxford University Press, 2012.

C. Frid, E. Andonegi, J. Depestele, A. Judd, D. Rihan, S. I. Rogers, E. Kenchington, The environmental interactions of tidal and wave energy generation devices, Environmental Impact Assessment Review 32 (1) (2012) 133-139.

S. W. Funke, S. C. Kramer, M. D. Piggott, Design optimisation and resource assessment for tidal-stream renewable energy farms using a new continuous turbine approach, Renewable Energy 99 (2016) 1046-1061.

K. A. Haas, H. M. Fritz, S. P. French, B. T. Smith, V. Neary, Assessment of energy production potential from tidal streams in the United States, Tech. rep., Georgia Tech Research Corporation (2011).

N. Hill, R. Dominy, G. Ingram, J. Dominy, Darrieus turbines: the physics of self-starting, Proc. IME J. Power Energy, 223 (1) (2009), pp. 21-29

R. Isermann and M. Münchhof, 2011, Identification of Dynamic Systems: An Introduction with Applications, Vol. 1, Springer, Berlin Heidelberg.

M. Islam, D. S.-K. Ting, A. Fartaj, Aerodynamic models for Darrieus-type straight-bladed vertical axis wind turbines, Renew. Sustain. Energy Rev., 12 (4) (2008), pp. 1087-1109

C. Johnstone, D. Pratt, J. Clarke, A. Grant, A techno-economic analysis of tidal energy technology, Renew. Energy 49 (2013) 101-106.

M. A. Kamoji, S. B. Kedare, S. V. Prabhu, Performance tests on helical Savonius rotors, Renew. Energy, 34 (3) (2009), pp. 521-529

B. Kirkle, L. Lazauskas, Enhancing the performance of vertical axis wind turbine using a simple variable pitch system, Wind Eng., 15 (4) (1991), pp. 187-195

N. D. Laws, B. P. Epps, Hydrokinetic energy conversion: Technology, re-search, and outlook, Renewable and Sustainable Energy Reviews 57 (2016) 1245-1259.

M. Lewis, S. Neill, P. Robins, M. Hashemi, Resource assessment for future generations of tidal-stream energy arrays, Energy 83 (2015) 403-415.

C. Li, S. Zhu, Y. Xu, Y. Xiao, 2.5D large eddy simulation of vertical axis wind turbine in consideration of high angle of attack flow, Renew. Energy, 51 (2013), pp. 317-330

G. Li, W. Zhu, Design and power loss evaluation of a noncircular gear pair for an infinitely variable transmission, Mechanism and Machine Theory, 156, 2021, 104137.

H. W. Liu, W. Li, Y. G. Lin, S. Ma, Tidal current turbine based on hydraulic transmission system, Journal of Zhejiang University-SCIENCE A 12 (7) (2011) 511-518.

K. Liu, M. Yu, W. Zhu, Enhancing wind energy harvesting performance of vertical axis wind turbines with a new hybrid design: A fluid-structure interaction study, Renewable Energy 140 (2019) 912-927.

A. C. Mahato, S. K. Ghoshal, Various power transmission strategies in wind turbine: An overview, International Journal of Dynamics and Control 7 (3) (2019) 1149-1156.

J. F. Manwell, J. G. McGowan, and A. L. Rogers, 2010, Wind Energy Explained: Theory, Design and Application, John Wiley & Sons.

M. Nakajima, S. Iio, T. Ikeda, Performance of double-step Savonius rotor for environmentally friendly hydraulic turbine, J. Fluid Sci. Technol., 3 (2008), pp. 410-419

I. Paraschivoiu, Wind Turbine Design: with Emphasis on Darrieus Concept, Presses inter Polytechnique (2002)

G. Payne, A. Kiprakis, M. Ehsan, W. H. S. Rampen, J. Chick, A. Wallace, Efficiency and dynamic performance of digital displacement™ hydraulic transmission in tidal current energy converters, Proceedings of the Institution of Mechanical Engineers, Part A: Journal of Power and Energy 221 (2) (2007) 207-218.

A. M. Plagge, L. Jestings, B. P. Epps, Next-generation hydrokinetic power take-off via a novel variable-stroke hydraulic system, in: Proceedings of International Conference on Offshore Mechanics and Arctic Engineering, Vol. 45547, American Society of Mechanical Engineers, 2014, p. V09BT09A018.

M. Ross, 1997, "Fuel Efficiency and the Physics of Automobiles," Contemporary Physics, 38(6), pp. 381-394.

O. Rourke, F. Boyle and A. Reynolds, "Tidal energy update 2009," Applied Energy, vol. 87, pp. 398-409, 2010.

S. J. Sangiuliano, Turning of the tides: Assessing the international implementation of tidal current turbines, Renewable and Sustainable Energy Reviews 80 (2017) 971-989.

E. Segura, R. Morales, J. Somolinos, A. Lopez, Techno-economic challenges of tidal energy conversion systems: current status and trends, Renew. Sustain. Energy Rev. 77 (2017) 536-550.

A. Sgobbi, S .G. Simoes, D. Magagna, W. Nijs, Assessing the impacts of technology improvements on the deployment of marine energy in europe with an energy system perspective, Renew. Energy 89 (2016) 515-525.

K. Touimi, M. Benbouzid, P. Tavner, Tidal stream turbines: With or with-out a gearbox?, Ocean Engineering 170 (2018) 74-88.

A. Uihlein and D. Magagna, "Wave and tidal current energy—A review of the current state of research beyond technology," Renewable and Sustainable Energy Reviews, vol. 58, pp. 1070-1081,2016.

X. F. Wang, and W. D. Zhu, 2016, "Design, Modeling, and Experimental Validation of a Novel Infinitely Variable Transmission Based on Scotch Yoke Systems," ASME Journal of Mechanical Design, 138(1), p. 015001.

X. F. Wang, and W. D. Zhu, 2018, "Design and Stability Analysis of an Integral Time-Delay Feedback Control Combined With an Open-Loop Control for an Infinitely Variable Transmission System," ASME Journal of Dynamic Systems, Measurement, and Control, 140(1), p. 011007.

D. W. Wekesa, C. Wang, Y. Wei, L. A. M. Danao, Influence of operating conditions on unsteady wind performance of vertical axis wind turbines operating within a fluctuating free-stream: a numerical study, J. Wind Eng. Ind. Aerod., 135 (2014), pp. 76-89

D. W. Wekesa, C. Wang, Y. Wei, J. N. Kamau, L .A. M. Danao A numerical analysis of unsteady inflow wind for site specific vertical axis wind turbine: a case study for Marsabit and Garissa in Kenya, Renew. Energy, 76 (2015), pp. 648-661

D. W. Wekesa, C. Wang, Y. Wei, W. Zhu, Experimental and numerical study of turbulence effect on aerodynamic performance of a small-scale vertical axis wind turbine, J. Wind Eng. Ind. Aerod., 157 (2016), pp. 1-14

Y. Xiong, C. R. Berger, Chesapeake bay tidal characteristics, Journal of Water Resource and Protection 2 (7) (2010) 619.

What is claimed is:

1. A tidal current energy converter (TCEC) comprising: (i) at least one infinitely variable transmission (IVT) comprising an IVT control system comprising a crank length controller, a forward speed controller, or both; and (ii) at least one vertical axis water turbine (VAWT), wherein the VAWT is a hybrid VAWT comprising a modified-Savonius (MS) rotor in a central region around a central axis and a straight bladed H-type Darrieus rotor in an annular region surrounding the MS rotor.

2. The TCEC of claim 1, wherein the IVT control system comprises:
a crank length controller comprising electronic components configured to:
determine a desired output rotation speed of an infinitely variable transmission; and
determine a control signal for a crank length control mechanism based on the determined output rotation speed; and
a crank length control mechanism configured to receive the control signal and control the crank length of the infinitely variable transmission based on the control signal.

3. The TCEC of claim 2, wherein the crank length controller is configured to:
determine an estimated output rotation speed of the infinitely variable transmission; and determine the control signal for the crank length control mechanism based on the estimated output rotation speed.

4. The TCEC of claim 2, wherein the crank length controller is configured to change the control signal for adjusting the crank length based on an estimate of the output rotation speed of the infinitely variable transmission.

5. The TCEC of claim 1, wherein the infinitely variable transmission comprises a pair of meshed gears, an input-control module, and a motion conversion module.

6. The TCEC of claim 5, wherein the pair of meshed gears are noncircular gears.

7. The TCEC of claim 1, wherein the IVT control system comprises:
an input-control module configured to control a motion conversion module of an infinitely variable transmission; and
a forward speed controller comprising electronic components configured to:
determine a crank length for the infinitely variable transmission, a desired modulated input speed of the input-control module, and an output torque of an output shaft of the infinitely variable transmission; and
output a control signal to the input-control module based on the determined crank length, the desired modulated input speed, and the output torque.

8. The TCEC of claim 7, wherein the input-control module includes an electronic motor configured to receive the control signal and to control modulation of an input rotation speed of the input-control module based on the control signal.

9. The TCEC of claim 7, wherein the forward speed controller comprises a time-delay feedback controller configured to:
determine an input speed of the infinitely variable transmission; and
adjust the control signal to the input-control module based on a tracking error of the output speed of the infinitely variable transmission.

10. The TCEC of claim 1, wherein the IVT control system comprises:
(i) a crank length controller comprising electronic components configured to:
determine a desired output rotation speed of an infinitely variable transmission; and
determine a control signal for a crank length control mechanism based on the determined output rotation speed; and
a crank length control mechanism configured to receive the control signal and control the crank length of the infinitely variable transmission based on the control signal; and
(ii) an input-control module configured to control a motion conversion module of an infinitely variable transmission; and
a forward speed controller comprising electronic components configured to:
determine a crank length for the infinitely variable transmission, a desired modulated input speed of the input-control module, and an output torque of an output shaft of the infinitely variable transmission; and
output a control signal to the input-control module based on the determined crank length, the desired modulated input speed, and the output torque.

11. A tidal current energy converter (TCEC) comprising:
(i) at least one infinitely variable transmission (IVT) comprising an IVT control system comprising a crank length controller, a forward speed controller, or both; and (ii) at least one vertical axis water turbine (VAWT), wherein the VAWT is a hybrid VAWT comprising:
(a) a first rotor system positioned in a central region and rotatable about a central axis, wherein the first rotor system comprises: a plurality of first blades, each having a concave shape that allows fluid to push on a concave side of each first blade; and a hydraulic brake system that is mounted upon a shaft with bearings; and
(b) a second rotor system positioned in an annular region surrounding the first rotor system in the central region, wherein the second rotor system comprises a plurality of second blades spaced about the central axis, wherein the cross-section of each second blade is a substantially symmetrical airfoil shape.

12. The TCEC of claim 11, wherein the plurality of second blades are straight-bladed.

13. The TCEC of claim 11, wherein the IVT control system comprises:
a crank length controller comprising electronic components configured to:
determine a desired output rotation speed of an infinitely variable transmission; and
determine a control signal for a crank length control mechanism based on the determined output rotation speed; and
a crank length control mechanism configured to receive the control signal and control the crank length of the infinitely variable transmission based on the control signal.

14. The TCEC of claim 13, wherein the crank length controller is configured to change the control signal for adjusting the crank length based on an estimate of the output rotation speed of the infinitely variable transmission.

15. The TCEC of claim 11, wherein the IVT control system comprises:
an input-control module configured to control a motion conversion module of an infinitely variable transmission; and
a forward speed controller comprising electronic components configured to:
determine a crank length for the infinitely variable transmission, a desired modulated input speed of the input-control module, and an output torque of an output shaft of the infinitely variable transmission; and
output a control signal to the input-control module based on the determined crank length, the desired modulated input speed, and the output torque.

16. The TCEC of claim 11, wherein the shaft is (i) a static non-turning shaft, and the first rotor system is mounted upon, and rotates around, the static non-turning shaft, or (ii) a rotating shaft, and the first rotor system is attached to the rotating shaft, and the rotating shaft rotates about the central axis.

17. A tidal current energy converter (TCEC) comprising:
(i) at least one infinitely variable transmission (IVT) comprising an IVT control system comprising a crank length controller, a forward speed controller, or both; and (ii) at least one vertical axis water turbine (VAWT), wherein the VAWT is a hybrid VAWT comprising:
(a) a first rotor system positioned in a central region and rotatable about a central axis, wherein the first rotor system comprises:
(i) at least two blade-sets stacked vertically along the central axis, each blade-set comprising a plurality of first blades that are spaced about the central axis, wherein the at least two blade-sets are mounted upon a shaft with bearings along the central axis, wherein each first blade extends from a position proximate to the central axis out to a position distal to the central axis and has a concave shape that allows fluid to push on a concave side of each first blade, and (ii) a hydraulic brake system that is mounted upon the shaft with bearings; and (b) a second rotor system positioned in an annular region surrounding the first rotor system in the central region, wherein the second rotor system comprises a plurality of second blades spaced about the central axis, wherein each of the second blades is positioned substantially parallel to the central axis and attached to at least one blade-set of the first rotor system using at least two supporting struts, wherein the cross-section of the second blade is a substantially symmetrical airfoil shape.

18. The TCEC of claim 17, wherein each blade-set includes a circular top plate and a circular bottom plate, wherein the circular plates are substantially perpendicular to the central axis, and wherein the plurality of first blades are positioned therebetween.

19. The TCEC of claim 18, wherein each first blade is rectangular and has a first blade length and a first blade height, wherein the first blade height is equal to the distance between the circular top and bottom plates in the blade-set, and wherein the first blade length is greater than a radius of the circular top and bottom plates, leading to the concave shape.

20. The TCEC of claim 17, wherein the first blades in each blade-set are offset about 20-60 degrees about the central axis from the first blades in each other blade-set.

21. The TCEC of claim 17, wherein the IVT control system comprises:

an input-control module configured to control a motion conversion module of an infinitely variable transmission; and a forward speed controller comprising electronic components configured to:
determine a crank length for the infinitely variable transmission, a desired modulated input speed of the input-control module, and an output torque of an output shaft of the infinitely variable transmission; and output a control signal to the input-control module based on the determined crank length, the desired modulated input speed, and the output torque.

22. The TCEC of claim 17, wherein the IVT control system comprises:

a crank length controller comprising electronic components configured to:
determine a desired output rotation speed of an infinitely variable transmission; and
determine a control signal for a crank length control mechanism based on the determined output rotation speed; and a crank length control mechanism configured to receive the control signal and control the crank length of the infinitely variable transmission based on the control signal.

23. The TCEC of claim 22, wherein the crank length controller is configured to change the control signal for adjusting the crank length based on an estimate of the output rotation speed of the infinitely variable transmission.

24. The TCEC of claim 17, wherein the shaft is (i) a static non-turning shaft, and the first rotor system is mounted upon, and rotates around, the static non-turning shaft, or (ii) a rotating shaft, and the first rotor system is attached to the rotating shaft, and the rotating shaft rotates about the central axis.

* * * * *